(12) United States Patent
Kukal et al.

(10) Patent No.: US 10,678,978 B1
(45) Date of Patent: Jun. 9, 2020

(54) METHODS, SYSTEMS, AND COMPUTER PROGRAM PRODUCT FOR BINDING AND BACK ANNOTATING AN ELECTRONIC DESIGN WITH A SCHEMATIC DRIVEN EXTRACTED VIEW

(71) Applicant: Cadence Design Systems, Inc., San Jose, CA (US)

(72) Inventors: Taranjit Singh Kukal, New Delhi (IN); Arnold Jean Marie Gustave Ginetti, Antibes (FR); Madhur Sharma, Ghaziabad (IN); Balvinder Singh, Faridabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 126 days.

(21) Appl. No.: 15/721,853

(22) Filed: Sep. 30, 2017

(51) Int. Cl.
G06F 17/50 (2006.01)
G06F 30/31 (2020.01)
H05K 3/00 (2006.01)
G06F 30/33 (2020.01)
G06F 30/398 (2020.01)
G06F 30/337 (2020.01)
G06F 30/3308 (2020.01)
G06F 30/373 (2020.01)
G06F 30/367 (2020.01)
(Continued)

(52) U.S. Cl.
CPC ............. *G06F 30/31* (2020.01); *G06F 30/33* (2020.01); *G06F 30/337* (2020.01); *G06F 30/3308* (2020.01); *G06F 30/367* (2020.01); *G06F 30/373* (2020.01); *G06F 30/398* (2020.01); *H05K 3/0005* (2013.01); *G06F 2111/12* (2020.01); *G06F 2111/20* (2020.01); *G06F 2206/1008* (2013.01)

(58) Field of Classification Search
None
See application file for complete search history.

(56) References Cited

U.S. PATENT DOCUMENTS 6,236,956 B1 * 5/2001 Mantooth ................. G06F 8/34
703/14
6,366,874 B1 * 4/2002 Lee ..................... G06F 17/5045
703/14

(Continued)

OTHER PUBLICATIONS

Non-Final Office Action dated Jun. 14, 2019 for U.S. Appl. No. 15/721,845.

(Continued)

*Primary Examiner* — Leigh M Garbowski
(74) *Attorney, Agent, or Firm* — Vista IP Law Group, LLP

(57) ABSTRACT

Disclosed are methods, systems, and articles of manufacture for binding and annotating an electronic design with a schematic driven extracted view. These techniques identify a schematic design and an extracted view of an electronic design and bind the schematic design with the extracted view. The resulting binding information concerning binding the schematic design with the extracted view is stored in a data structure. The schematic design may be annotated with extracted view information pertaining to the extracted view based at least in part upon the binding information. A response to a user action may be automatically generated based in part or in whole upon the extracted view information or the binding information.

20 Claims, 21 Drawing Sheets

(51) Int. Cl.
*G06F 111/20* (2020.01)
*G06F 111/12* (2020.01)

(56) References Cited

U.S. PATENT DOCUMENTS

| | | | |
|---|---|---|---|
| 6,865,725 B2 | 3/2005 | Dickey | |
| 7,089,512 B2* | 8/2006 | Iadanza | G06F 17/5036 716/102 |
| 7,120,893 B2 | 10/2006 | Sasaki | |
| 7,159,202 B2 | 1/2007 | Lee | |
| 7,206,731 B2* | 4/2007 | Sercu | G06F 17/5036 703/14 |
| 7,418,683 B1* | 8/2008 | Sonnard | G06F 17/5081 716/122 |
| 7,451,069 B2* | 11/2008 | Moosburger | G06F 17/5009 703/1 |
| 8,176,463 B2* | 5/2012 | O'Riordan | G06F 17/504 703/14 |
| 8,209,650 B2* | 6/2012 | St. John | G06F 17/5063 716/101 |
| 8,261,228 B1* | 9/2012 | Gopalakrishnan | G06F 17/5081 703/14 |
| 8,584,072 B1* | 11/2013 | Gopalakrishnan | G06F 17/5081 716/111 |
| 8,612,921 B1* | 12/2013 | Gopalakrishnan | G06F 17/5081 716/111 |
| 8,656,329 B1 | 2/2014 | Kukal | |
| 8,689,169 B2* | 4/2014 | Fischer | G06F 17/5068 716/100 |
| 8,707,230 B1 | 4/2014 | Hu | |
| 8,726,207 B2 | 5/2014 | Jiang | |
| 8,732,636 B2* | 5/2014 | Ginetti | G06F 17/5036 716/101 |
| 8,732,640 B1* | 5/2014 | Krishnan | G06F 17/5068 716/110 |
| 8,762,906 B2* | 6/2014 | Ginetti | G06F 17/5036 716/106 |
| 8,782,577 B2* | 7/2014 | Fischer | G06F 17/5068 716/100 |
| 9,223,915 B1* | 12/2015 | Ginetti | G06F 17/5022 |
| 9,245,073 B2 | 1/2016 | Fu | |
| 9,280,621 B1 | 3/2016 | Ginetti | |
| 9,286,421 B1* | 3/2016 | Kukal | G06F 17/5022 |
| 9,317,638 B1 | 4/2016 | Banka | |
| 9,342,647 B2 | 5/2016 | Chen | |
| 9,390,218 B2 | 7/2016 | Lee | |
| 9,449,130 B1* | 9/2016 | Kukal | G06F 17/5022 |
| 9,645,715 B1* | 5/2017 | Jain | G06F 17/50 |
| 9,779,193 B1 | 10/2017 | Ginetti | |
| 9,798,840 B1* | 10/2017 | Ginetti | G06F 17/5081 |
| 9,881,119 B1* | 1/2018 | Kukal | G06F 17/5036 |
| 10,078,715 B2 | 9/2018 | Sendig | |
| 10,102,324 B2 | 10/2018 | Oriordan | |
| 10,289,793 B1* | 5/2019 | Kukal | G06F 17/5077 |
| 2004/0111688 A1 | 6/2004 | Lee | |
| 2007/0094622 A1 | 4/2007 | Lee | |
| 2007/0233443 A1 | 10/2007 | Lai | |
| 2008/0244501 A1 | 10/2008 | Davison | |
| 2011/0035203 A1* | 2/2011 | Dalton | G06F 17/5009 703/14 |
| 2015/0269297 A1 | 9/2015 | Tuan | |
| 2016/0125115 A1 | 5/2016 | Strang | |
| 2017/0169146 A1 | 6/2017 | Chen | |
| 2017/0169156 A1 | 6/2017 | Perez | |
| 2017/0249400 A1 | 8/2017 | Oriordan | |
| 2017/0249410 A1* | 8/2017 | Baker | G06F 17/5036 |
| 2017/0255742 A1 | 9/2017 | Lee | |

OTHER PUBLICATIONS

Notice of Allowance dated Jun. 27, 2019 for U.S. Appl. No. 15/721,851.

Notice of Allowance dated Oct. 2, 2019 for U.S. Appl. No. 15/721,845.

* cited by examiner

METHODS, SYSTEMS, AND COMPUTER PROGRAM PRODUCT FOR BINDING AND BACK ANNOTATING AN ELECTRONIC DESIGN WITH A SCHEMATIC DRIVEN EXTRACTED VIEW

CROSS REFERENCE TO RELATED APPLICATIONS

This U.S. patent application is cross related to U.S. patent application Ser. No. 15/721,845 filed concurrently and entitled "METHODS, SYSTEMS, AND COMPUTER PROGRAM PRODUCT FOR IMPLEMENTING SCHEMATIC DRIVEN EXTRACTED VIEWS FOR AN ELECTRONIC DESIGN" and U.S. patent application Ser. No. 15/721,851 filed concurrently and entitled "METHODS, SYSTEMS, AND COMPUTER PROGRAM PRODUCT FOR IMPLEMENTING A NET AS A TRANSMISSION LINE MODEL IN A SCHEMATIC DRIVEN EXTRACTED VIEW FOR AN ELECTRONIC DESIGN". The contents of the aforementioned U.S. patent applications are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern electronic design is typically performed with computer aided design (CAD) tools or electronic design automation (EDA) systems. To design an integrated circuit, a designer first creates high level behavior descriptions of the IC device using a high-level hardware design language (HDL). Common examples of HDLs include Verilog and VHDL. An EDA system typically receives the high level behavioral descriptions of the IC device and translates this high-level design language into netlists of various levels of abstraction. Essentially, the process to implement an electronic device begins with functional design and verification (e.g., using RTL), and then proceeds to physical design of a layout and verification.

Circuit designers and verification engineers use different methods to verify circuit designs. One common method of verification is through simulation of the circuit design of interest. Simulation dynamically verifies a design by monitoring behaviors of the design with respect to test stimuli. For many types of designs, simulation can and should be performed during the design process to ensure that the ultimate goals are achievable and will be realized by the finished product.

SPICE (Simulation Program with Integrated Circuit Emphasis) is a common type of simulator that is used to simulate and verify the operation of an electronic design. With SPICE, the electronic design is converted into a system of equation(s), which is then solved for a given set of inputs to check the state of specific portions of the circuit at given points in time. Furthermore, capturing the electrical behaviors of a circuit design requires correctly modeling various components of a circuit design to include, for example, geometric information, parasitic information, etc. Although many vendors provide, for example, SPICE models, s-parameter models, etc. for their devices, an IC design or a system design may involve much more than merely these device models for simulation. For example, the packaging may need to be properly accommodated in such models, the traces or interconnects may need to be modeled to reflect more realistic voltage drops, etc. For many circuit designs, this process can be a very computationally expensive and time-consuming effort, especially given the size and complexity of modern circuit designs.

Conventional approaches for simulations, especially for board or system level simulations (e.g., simulations performed on an electronic system including the printed circuit board or PCB, one or more integrated circuit (IC) chips, and IC packaging thereof) often extract a static simulation view from layouts (e.g., IC layout, package layout, board layout, etc.) by identifying a corresponding schematic symbol from the schematic symbol library for each of a plurality of layout circuit devices, invoking the corresponding layout editor, and performing the extraction therein. The extraction results are then saved as some textual form (e.g., an ASCII file for a SPICE netlist). As a result, these simulation views are often termed layout extracted views or simply extracted views; and they are understandable by the simulators but not much more beyond that. That is, the graphical representations or a simplified version thereof representing how circuit components are connected may be lost in the generation of these conventional extracted views. The electronic design may then undergo multiple rounds of changes to the schematic, the layout, or both the schematic and the layout after the initial simulation has been performed with a simulation view extracted from the initial layout.

When these changes occur at the schematic level, these conventional approaches require a designer to implement the changes in the schematic of the electronic design, push these schematic changes to create an updated layout with a layout editor, and then extract an updated simulation view with the updated layout. The simulator may then perform another round of simulation with the updated simulation view. This loop not only requires much more time and computational resources but also presents multiple other problems.

For example, modern electronic design may include devices having distributed pins, vector pins, etc. that may be represented as an input pin in the schematic symbol. During a simulation of, for example, an electronic design with a distributed Vcc having multiple Vcc pins for a distributed power network, this distributed Vcc may be schematically represented as a single Vcc pin in the corresponding schematic symbol. In this example, if the simulation result for the Vcc shows abnormal behavior the designer will need to guess which Vcc pin or Vcc pins are causing the abnormal behavior or perform some trial-and-error changes to identify the true cause of the abnormal behavior. Similar problems and hence challenges also arise for vector pins which may be even more difficult to troubleshoot and identify the root source of any abnormal behavior simulation result due to the multiplicity of the pins.

Another problems with these conventional approaches is that the extracted view from a layout is a static view. These simulation views are generated by traversing a layout to identify layout component designs and devices, identify a corresponding schematic symbol for each of the layout component designs, place the schematic symbol in the simulation view, and interconnect the schematic symbols by referencing the layout connectivity. Although these simulation views may in some cases appear to be identical or substantially similar to the original schematic from which the layout is generated, these simulation views or extracted views are not editable as the original schematic. As a result, any changes at the schematic level must go through the aforementioned schematic edit, layout edit, and re-extraction.

Moreover, these simulation views are often generated for the simulation engines and thus do not appear as readable or understandable by designers. More importantly, these extracted views are generated as a flat view having a single hierarchy that includes all the schematic symbols or models understood by the simulation engine. As a result, an extracted view loses the hierarchical structures of the electronic designs; and the loss of the hierarchical structure further exacerbates the difficulties in understanding or manipulating such an extracted view, even if the extracted view were to be editable.

Another problem with conventional approaches is that the same schematic symbol may correspond to multiple schematic instances in the schematic design and hence multiple layout instances in the layout. During the generation of an extracted view from the layout in conventional approaches, these multiple layout instances may be extracted and represented as the same schematic symbol whereas these multiple layout instances may not necessarily be identically implemented in the layout. For example, two or more of these multiple layout instances may be routed differently although then all correspond to the same schematic symbol. As a result, conventional simulation views cannot correct capture the differences in, for example, parasitics and/or electrical characteristics between these layout instances.

In addition to the aforementioned problems, what actually predicts the predicted behaviors is the extracted views because these extracted views model at least the components that may affect the electrical behaviors of the underlying circuit. Nonetheless, designers and users of various electronic design tools are more used to view and interact with schematic designs because a schematic design delineates how circuit components are interconnected with each other although the schematic design may not indicate or even imply the scales or sizes of these circuit component designs. As described above, conventional extracted views are obtained from various layouts and are created in a form (e.g., ASCII file) that is understood by the simulators (e.g., SPICE simulators) but not the users, at least not in a graphical way that resembles how circuit component designs are interconnected. Although these extracted views may be back annotated or associated with the underlying schematic, these extracted views are not intuitive and not understandable unless the users parse through the textual description therein. Moreover, even if users can parse through these extracted views and understand their contents, these conventional extracted views often cluttered the design space and thus provide not much value, if any at all, for users to perform their intended tasks.

At Giga-hertz (GHz) frequencies, long interconnect leads may exhibit transmission line behavior because of the fast rise/fall times of signals. Moreover, with the use of wider wires, inductive impedance ($j\omega L$) at high frequencies (e.g., microwave, RF or radio frequency, etc.) becomes comparable to the resistive component (R) of the major signal wires and power/ground nets. For copper wires, this phenomenon becomes even more prominent. Such parasitic inductance may cause additional signal delays, over-shoot waveforms, increased ground bounce, and inductive crosstalk so clock trees and the power/ground grids need to be designed more carefully to avoid large clock skew, signal inductive coupling, ground bounce, etc.

Conventional approaches merely consider the inductive effects of interconnect leads only for a few global clock wires and major signal buses. This has been proved to be insufficient because of higher clock frequencies and faster signal rise/fall times. Three-dimensional (3D) or two-and-a-half (2.5D) electromagnetic (EM) full wave field solvers are available but do not have the capacity to manage modern ICs and often become prohibitively expensive, especially those having large, complex circuits. These problems and challenges are in addition to those pertaining to conventional, layout-driven extracted views.

Thus, what are needed are methods, systems, and computer program products for binding and annotating an electronic design with a schematic driven extracted view to address at least the aforementioned issues and shortcomings.

SUMMARY

Disclosed are method(s), system(s), and article(s) of manufacture for binding and annotating an electronic design with a schematic driven extracted view in one or more embodiments. Some embodiments are directed at a method for binding and annotating an electronic design with a schematic driven extracted view.

In some embodiments, these techniques identify a schematic design and an extracted view of an electronic design and bind the schematic design with the extracted view. The resulting binding information concerning binding the schematic design with the extracted view is stored in a data structure. The schematic design may be annotated with extracted view information pertaining to the extracted view based at least in part upon the binding information. A response to a user action may be automatically generated based in part or in whole upon the extracted view information or the binding information.

In some of these embodiments, a layout of the electronic design may further be identified, and the user action may include a probing action that obtains one or more electrical characteristics of the schematic design. To generate a response to the user action, a first user selection of a first schematic circuit component design may be identified in the schematic design; and a first model corresponding to the first schematic circuit component design may be emphasized in the extracted view or a model tree structure in response to the first user selection.

In some of these embodiments, a second user selection of a second model may be identified in the extracted view; and a second schematic circuit component design corresponding to the second model may be emphasized in the schematic design or a schematic design tree structure in response to the second user selection.

In some embodiments where a response is generated to a user action, a schematic circuit component design corresponding to the user action may be identified; a model corresponding to the schematic circuit component design may also be identified from the extracted view; and a type for the schematic circuit component design may be determined.

Based in part or in whole upon the type or the model that corresponds to the schematic circuit component design, a point of interest may be identified in the schematic design. One or more electrical characteristics at the point of interest may be identified by using at least the extracted view; and the one or more electrical characteristics may be presented in a user interface.

In some embodiments, disambiguation processing may be performed in response to the user action based at least in part upon the type for the schematic circuit component design. In addition or in the alternative, error handling processing may be performed in response to the user action based at least in part upon the type for the schematic circuit component design.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various techniques are directed to binding and annotating an electronic design with a schematic driven extracted view in various embodiments. In these embodiments, a schematic-driven extracted view of an electronic design is identified. This extracted view may include one or more models representing one or more corresponding schematic circuit component designs. A binding may be established between at least two of the schematic design, the corresponding layout, an extracted view, the one or more models in the extracted view, the one or more corresponding schematic circuit component designs, and/or one or more corresponding layout circuit component designs. The resulting binding information may be stored in a data structure that may be further indexed (e.g., with a unique key such as a unique identifier) to facilitate faster access to and retrieval of information from the data structure.

With the extracted view and the binding, the schematic design and/or the layout may be annotated with various types of information to facilitate various EDA (electronic design automation) tasks such as probing, testing, modification, fine-tuning, optimization, etc. to prepare the underlying electronic design or to finalize the electronic design for mask preparation and mask writing as well as for tapeout for the eventual manufacturing of the electronic circuits represented by the electronic design.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
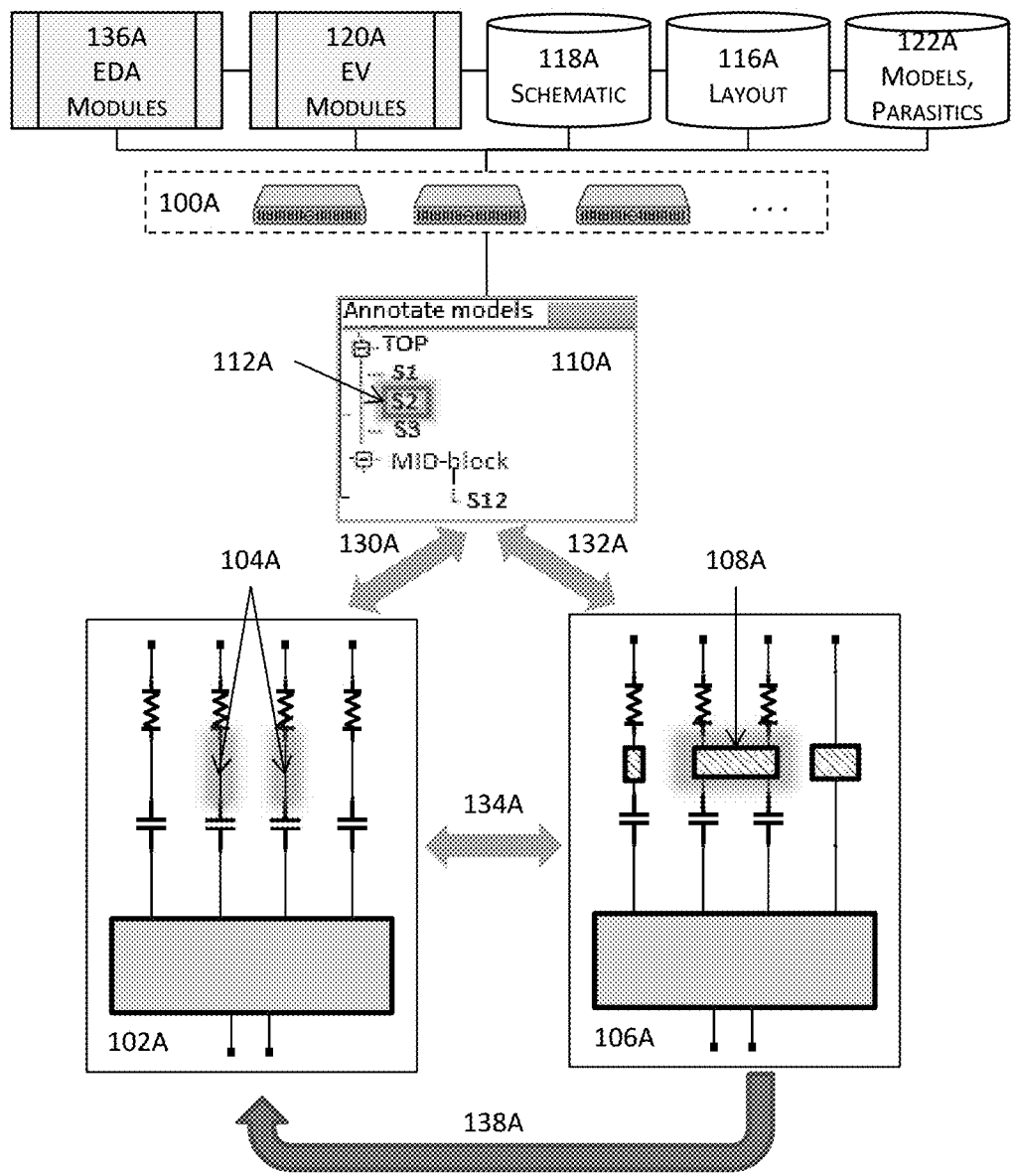
FIG. 1 illustrates a high level block diagram of a simplified system for binding and annotating an electronic design with a schematic driven extracted view in one or more embodiments.

FIG. 1 illustrates a high level block diagram of a simplified system for binding and annotating an electronic design with a schematic driven extracted view in one or more embodiments. In this illustrated system, one or more computing systems 100A may invoke and execute various modules to identify an extracted view 106A for an electronic design. These one or more computing systems may further identify, for example, a schematic design 102A, a layout (not shown), etc. and bind the extracted view 106A, one or more models (e.g., the model 108A representing schematic circuit component design 104A in the schematic design 102A) therein, and/or various types of extracted view information pertaining to the extracted view 106A and/or to the one or more models therein with the schematic design 102A, the layout, etc.

These one or more computing systems 100A may further annotate (e.g., back annotate 138A) the electronic design (e.g., the schematic design 102A) with various types of information to facilitate the performance of various tasks or operations on the schematic design 102A. For example, a user may probe or select the schematic circuit component design 104A (as shown by two graphically emphasized net segments) in the schematic design 102A, and the binding (130A, 132A, and 134A) between the schematic design 102A and the extracted view 106A may automatically show the extracted view 106A with the corresponding model 108A highlighted in the extracted view. The binding may further provide the capability of graphically and/or textually emphasizing the corresponding circuit component designs or models 112A in an annotation browser 110A showing the hierarchical structure in response to the selection of the schematic circuit component design 104A.

With various types of extracted view information annotated in the electronic design (e.g., the schematic design 102A although other types of the electronic design may also be annotated), a user may have much better access to such design-related information (e.g., electrical behaviors, parasitic data, timing data, electrical/physical/geometric data, etc.) to further facilitate the performance of various tasks on the schematic design. For example, a user may probe a point or a schematic design circuit component design, and the system may automatically identify the corresponding pertinent data (e.g., electrical behaviors) obtained through simulating the extracted view and present the corresponding pertinent data to the user.

In some cases where the probing location or schematic design circuit component design does not definitely identify a single response, the system may further respond to the user's probing action with a question. For example, a user may probe a net (e.g., by clicking on the net 104A) to seek voltage information. The system may respond by asking the user to determine whether the user would like to obtain the voltage information at the capacitor end or at the resistor end of net 104A by using the binding information. Based on the user's additional input, the system may retrieve and present the pertinent voltage information to the user.

As described above, the one or more computing systems 100A may invoke and execute one or more modules to perform various intended functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100A for execution.

These modules may include one or more EDA (electronic design automation) modules 136A such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design for finalizing the electronic design for mask preparation and mask writing as well as for tapeout for the eventual manufacturing of the electronic circuits represented by the electronic design.

These models may also include extracted view modules 120A that may include, for example, one or more model annotator modules that are configured to annotate an electronic design abstraction with information pertaining to one or more extracted views corresponding to the electronic design abstraction. The extract view modules 120A may further include 3D and/or 2.5D modeling tools to model various components in the 3D or 2.5D space, extraction modules to extract geometric, physical, and/or electrical characteristics, properties, or attributes from various sources (e.g., layouts, SEM or scanning electron microscope photos, etc.), meshing module(s) to discretize an area or a volume into a plurality of meshes, and/or one or more geometry simplification or reduction modules to simplify geometries by approximating more complex geometries with simpler geometries (e.g., by approximating a curve with a plurality of straight segments depending upon the resource requirements and/or the accuracy requirements).

The extracted view modules 120A may also include one or more EM (electromagnetic) field solver modules, heuristic solver modules, and/to empirical formula solver modules to solve for the electrical behavior of an underlying electronic circuit. The extracted view modules 120A may further include a pre-layout exploration module that estimates the characteristics, attributes, and/or properties of a circuit component design, without invoking any layout editors.

These one or more computing systems 100A may further access a schematic design database 118A and a layout database 116A when generating an extracted view from a schematic design of an electronic design. A plurality of models (e.g., SPICE sub-circuits, IBIS models, s-parameter models, etc.) and/or parasitic data 122A may also be stored and made available to these one or more computing systems.

For example, some embodiments may store parasitic data of some parameterized, pre-existing, or pre-characterized electronic circuit component designs in a tabular structure (e.g., a database) so that these one or more computing systems, when modeling an electronic circuit component design as model in an extracted view, may look up the parasitic data, model data, or even a parameterized model for a substantially similar or previously characterized electronic circuit component design so that these one or more computing systems 100A no longer need to expend as much or any computational resources in constructing the model for the electronic circuit component design.

Figure 2A:
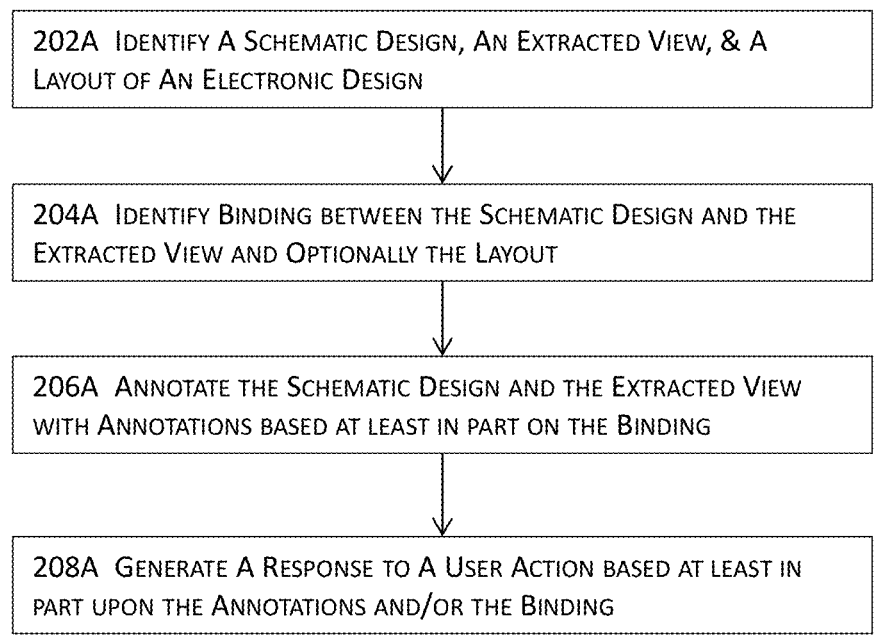
FIG. 2A illustrates a high level block diagram for binding and annotating an electronic design with a schematic driven extracted view in one or more embodiments.

FIG. 2A illustrates a high level block diagram for binding and annotating an electronic design with a schematic driven extracted view in one or more embodiments. In these illustrated embodiments, a schematic design of an electronic design and an extracted view derived from the schematic design may be identified at 202A. In some of these embodiments, the corresponding layout of the underlying electronic design may also be optionally identified at 202A.

A binding may be established at 204A between the schematic design and the extracted view. The binding may include links between the schematic design and the extracted view in some embodiments and links between one or more schematic circuit component designs and one or more corresponding models (e.g., s-parameter models, IBIS models, transmission line models, SPICE sub-circuits, any combinations thereof, etc.) in some other embodiments.

With the binding established, the schematic design may be back annotated at 206A with extracted view information pertaining to the extracted view based in part or in whole upon binding information about the binding between the schematic design and the extracted view. The extracted view information pertaining to the extracted view may include, for example, various pieces of information or data about the extracted view and/or one or more abstractions (e.g., the schematic designs, the layouts, etc. in one or more design fabrics) of the underlying electronic design, electrical behaviors, parasitic data, timing data, electrical/physical/geometric data of various circuit design components, information about the models and their respective model components in the extracted view, or any other data pertaining to the extracted view or the underlying electronic design.

A response may be generated at 208A in response to a user action performed on or for the schematic design based in part or in whole upon the annotations and/or the binding between the schematic design and the extracted view. In these embodiments, these techniques leverage the binding as well as the annotations to automatically generate a response to a user's action to facilitate design closure and the eventual mask writing as well as the manufacturing of the underlying electronic design. A user action may include, for example, a modification action to modify the schematic design, a probing action to obtain information about a specific portion of the schematic design, a selection or identification of a schematic circuit component design or a portion (e.g., a node, a net segment, etc.) thereof.

Figure 2B:
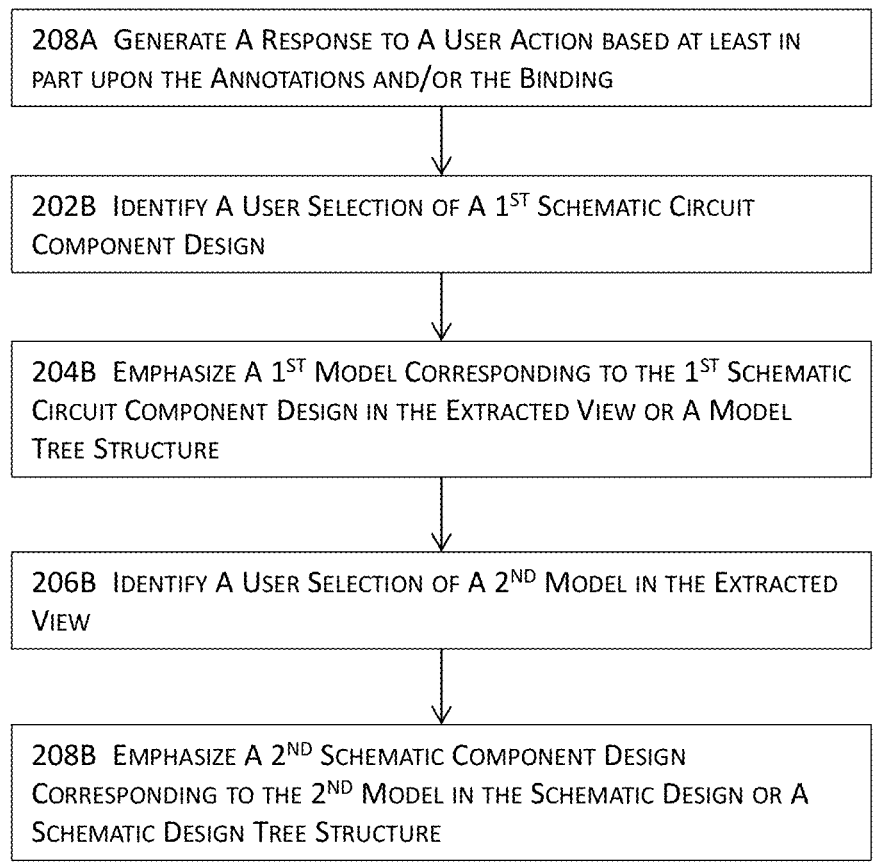
FIG. 2B illustrates more details about a portion of the high level block diagram illustrated in FIG. 2A in one or more embodiments.

FIG. 2B illustrates more details about a portion of the high level block diagram illustrated in FIG. 2A in one or more embodiments. More specifically, FIG. 2B illustrates more details about generating a response at 208A of FIG. 2A. For the ease of description and illustration, an example of a user's selection or identification of a schematic circuit component design is described with reference to FIG. 2B. It shall be noted that these techniques may also generate an automatic response to other types of user actions, and that the description of a user's selection or identification of a schematic circuit component design is not intended to limit the scope of the claims or the scope of such other types of user actions.

In these illustrated embodiments, a user's selection or identification of a first circuit component design may be identified at 202B. This first circuit component design may include a schematic circuit component design identified from a schematic design or a model included in the extracted view. For example, a user may simply click on a node or a portion of the schematic circuit component design in a user interface showing the schematic design. As another example, a user may inquire into some design related information (e.g., electrical behavior) about a schematic circuit component design. In this latter example, the schematic circuit component design may also be identified as the first schematic circuit component design at 202B.

Similarly, a model in the extracted view may also be identified at 202B when user clicks on the model in the extracted view. For the ease of description and illustration, FIG. 2B will be described with reference to a model being identified from the extracted view although the identification of the first circuit component design may be performed in various types of the electronic design—the schematic design, the layout, or the extracted view.

A first model, if any, corresponding to the identified schematic circuit component design may be graphically and/or textually emphasized at 204B in the extracted view or a model tree structure (e.g., a hierarchy structure listing the model components of the model). In these embodiments, a user identifies the first schematic circuit component design, and the system automatically invokes the extracted view and graphically and/or textually emphasizes the model corresponding to the identified schematic circuit component design so that the user understands whether the identified schematic circuit component design has been represented by a model for analysis modules, and if so, which model is used to represent the identified schematic circuit component design.

In some of these embodiments, other annotated information (e.g., the contents of the model, electrical behaviors, etc.) may also be presented to the user in response to the identification or selection of the schematic circuit component design. For example, the first model may include one or more additional schematic circuit component designs in addition to the identified schematic circuit component design. In this example, these one or more additional schematic circuit component designs may also be graphically and/or textually emphasized in the schematic design with the same emphasis scheme or with a different emphasis scheme to distinguish the identified schematic circuit component design from these one or more additional schematic circuit component designs.

In some embodiments, a user's selection or identification of a second model in the extracted view may be identified at 206B. For example, a user may click on the second model in the extracted view, and the second model may be identified at 206B.

In response to this user's selection or identification the second model in the extracted view, the second schematic circuit component design may be identified and may be further textually and/or graphically emphasized at 208B in the schematic design or in a hierarchical schematic design data structure. In these embodiments illustrated in 206B and 208B, a user may select a model in an extracted view, and the corresponding schematic circuit component design can be automatically shown in the schematic design so that the user understands which schematic circuit component designs are modeled and incorporated in the selected model. This understanding may help the user to select a more accurate or precise point or portion in the schematic design to probe, test, or troubleshoot the schematic design.

Figure 2C:
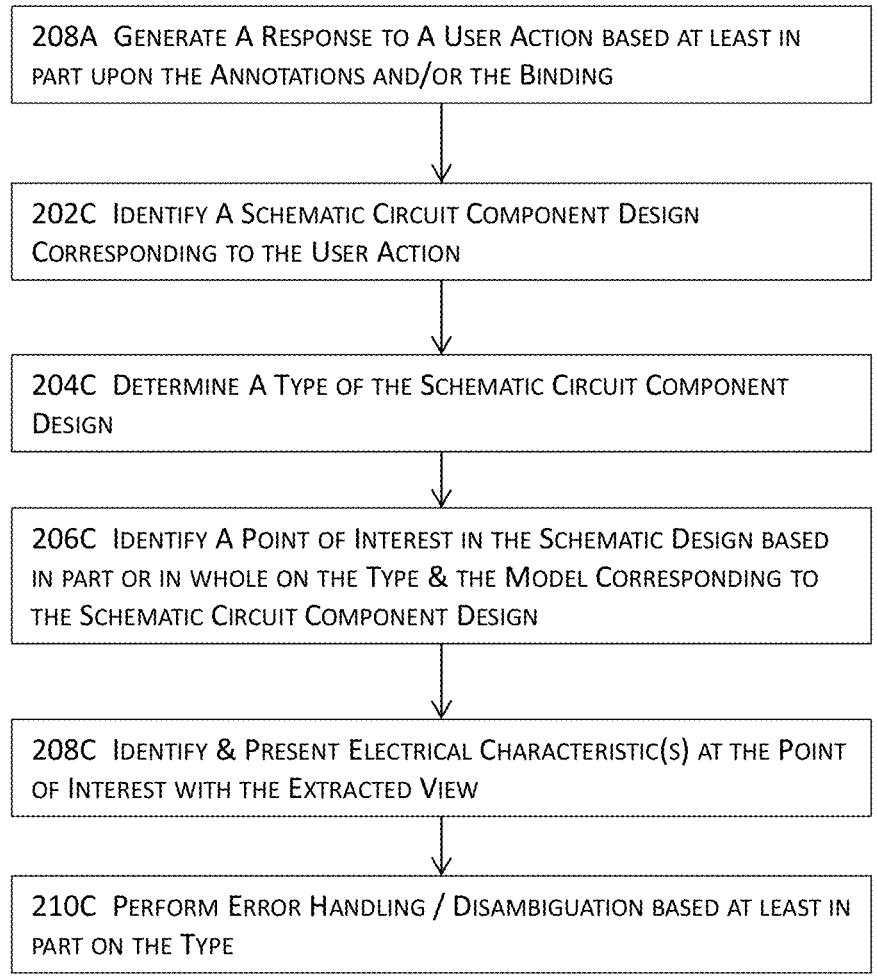
FIG. 2C illustrates more details about a portion of the high level block diagram illustrated in FIG. 2A in one or more embodiments.

FIG. 2C illustrates more details about a portion of the high level block diagram illustrated in FIG. 2A in one or more embodiments. More specifically, FIG. 2C illustrates more details about generating a response at 208A of FIG. 2A. In these illustrated embodiments, a schematic circuit component design that corresponds to a probing action may be identified at 202C. The probing action includes, for example, the determination or obtaining of electrical characteristics (e.g., voltage values, current, etc.) at a specific location or through a specific portion of a circuit component design.

A type of the schematic circuit component design may be determined at 204C. Some examples of types of schematic circuit component designs include device pins, distributed pins (e.g., distributed Vdd pins, distributed ground pins, etc.) that are collectively represented as a single logical pin in a schematic design, vector pins, a net or a net segment, etc.

The type of the identified schematic circuit component design may affect how the system responds to the identification or selection of the schematic circuit component design. For example, if a logical pin corresponds to a single physical pin, the voltage value from performing an electrical analysis on the extracted view may be identified for the single physical pin in the extracted view when a user probes a single logical pin for its voltage. On the other hand, if a single logical pin in the schematic design corresponds to multiple physical pins in the extracted view, the system's response to the identification or selection of this single logical pin may be different. For example, the system may respond by showing all the voltage values of all these multiple physical pins in some embodiments or further asking the user to identify which physical pin the user intended to probe in some other embodiments.

As another example, the system may respond by issuing an error message when a user attempts to probe a net that is fully enclosed within a model to indicate that such a probing action is not allowed. The system may further present which model component corresponds to the identified net in some of these embodiments. On the other hand, when the identified net is represented as a model interface (e.g., input to or output from another model component), the system may further ask the user to identify which end of the net the user intended to probe in some embodiments or may present the pertinent information (e.g., voltage values) at both ends of the identified net.

A point of interest may be identified at 206C in the schematic design based in part or in whole upon the type of the schematic circuit component design and also on the model that corresponds to the identified schematic circuit component design. This point of interest may be identified automatically when the system may definitely determine a single point of interest corresponding to the identification or selection of the schematic circuit component design at 202C. In some other embodiments where the system cannot definitely determine a single point of interest corresponding to the identification or selection of the schematic circuit component design, the system may further present an interactive dialogue box or window to seek further input or clarification from the user in some embodiments. In some other embodiments, the system may simply present the pertinent information (e.g., probed electrical behavior) of all the candidate points for the identified schematic circuit component design to the user.

One or more electrical characteristics may be identified at 208C from, for example, analysis results of one or more analyses performed on the extracted view for the identified point of interest. These one or more electrical characteristics may be presented in a user interface.

A conventional schematic design does not necessarily include sufficient information (or any information at all) to guide a user in selecting, identifying, or probing schematic circuit component designs. In some embodiments, error handling may be performed at 210C based at least in part upon the type(s) of schematic circuit component designs. For example, a schematic circuit component design that is fully enclosed in a model may not be directly probed in some embodiments. Nonetheless, a user may incidentally select this schematic circuit component design. In some embodiments, intelligence may be built into the system so that when a fully enclosed schematic circuit component design is selected, a warning message is issued to indicate that this selected schematic circuit component design cannot be directly probed, and this warning message may be issued even before the user issues the probing command.

In some embodiments where the schematic circuit component design is not identified in such a way to instruct the system to definitely determine a response, a disambiguation process may be performed to identify additional information so that the system may definitely determine a response. In an example involving a distributed pin that is represented as a single logical pin in a schematic design but corresponds to multiple physical pins in the layout, the disambiguation process may further ask a user to clarify which physical pin the user would like to select, or whether the user would like to obtain the results for all the physical pins. In some embodiments, the disambiguation process may simply present the results of all the physical pins of the net to the user.

In another example where a net is incorporated into a model as an interface of the model, the disambiguation process may ask the user to clarify which end of the net the user would like to select, or whether the user would like to obtain the results for both ends of the net. In some embodiments, the disambiguation process may simply present the results of both ends of the net to the user. In some embodiments where a user directly issues a probing command on a schematic circuit component design for which multiple values of a characteristic exist, the disambiguation process may also intervene to either ask for additional clarification or to present all of these multiple values with respective distinguishing information (e.g., respective physical pin identifiers).

Figure 3A:
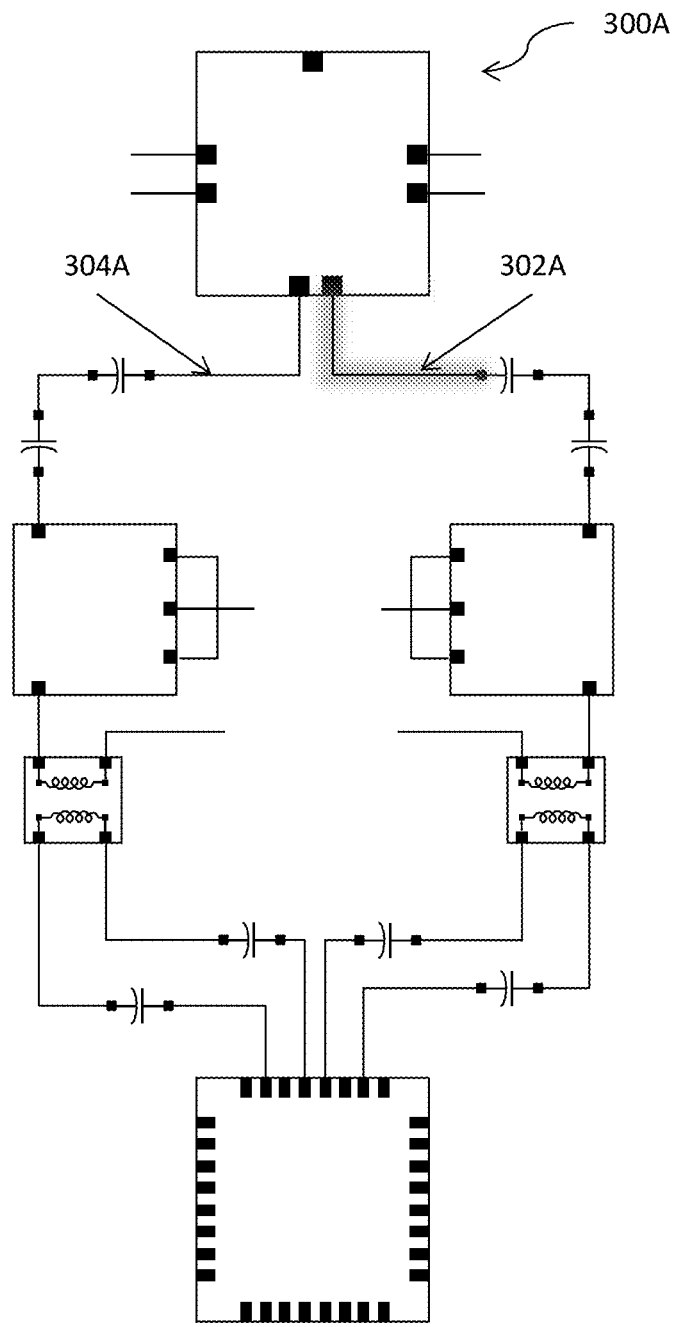
FIG. 3A illustrates an example of a simplified schematic design that is to be bound to and annotated with extracted view information from an extracted view in one or more embodiments.

FIG. 3A illustrates an example of a simplified schematic design that is to be bound to and annotated with extracted view information from an extracted view in one or more embodiments. This example schematic design 300A includes two nets of interest 302A and 304A and is subject to the binding and annotation operations described above with reference to FIGS. 1 and 2A-2C.

Figure 3B:
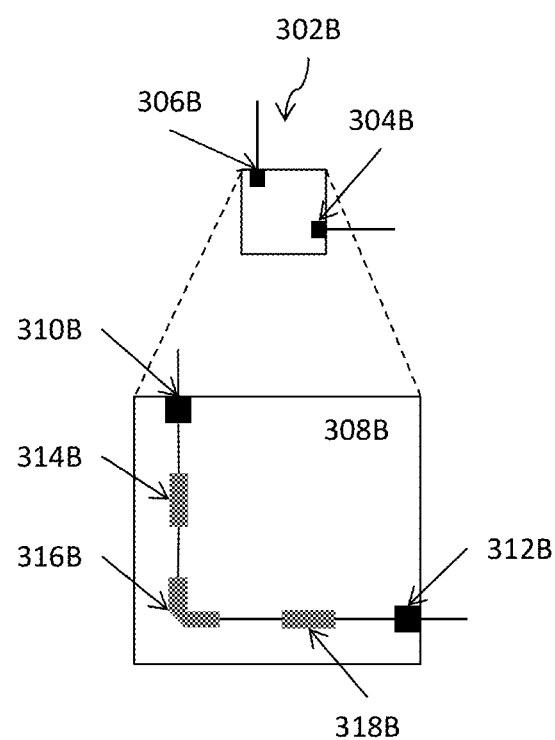
FIG. 3B illustrates an example of a model that may be used to represent a schematic circuit component design in an extracted view and to back annotate an electronic design in one or more embodiments.

FIG. 3B illustrates an example of a model that may be used to represent a schematic circuit component design in an extracted view and to back annotate an electronic design in one or more embodiments. More specifically, FIG. 3B shows the symbol 302B that may be used to represent the net of interest 302A in an extracted view. This symbol 302B may be created anew or modified from an existing schematic symbol. Moreover, this symbol 302B includes two interfaces 304B and 306B that may be used to interconnect this symbol to the corresponding portions in the extracted view in such a way to graphically resemble the original schematic design (e.g., 300A in FIG. 3A).

In addition, FIG. 3B further illustrates a simplified example of a transmission line model 308B including two interfaces 310B and 312B that respectively correspond to the interfaces 306B and 304B of the symbol 302B. This simplified example of transmission line model 308B further includes transmission line model components 314B (a straight line segment), 316B (a 90-degree bend), and 318B (another straight line segment) that are interconnected with each other and with the interfaces 310B and 312B.

Figure 3C:
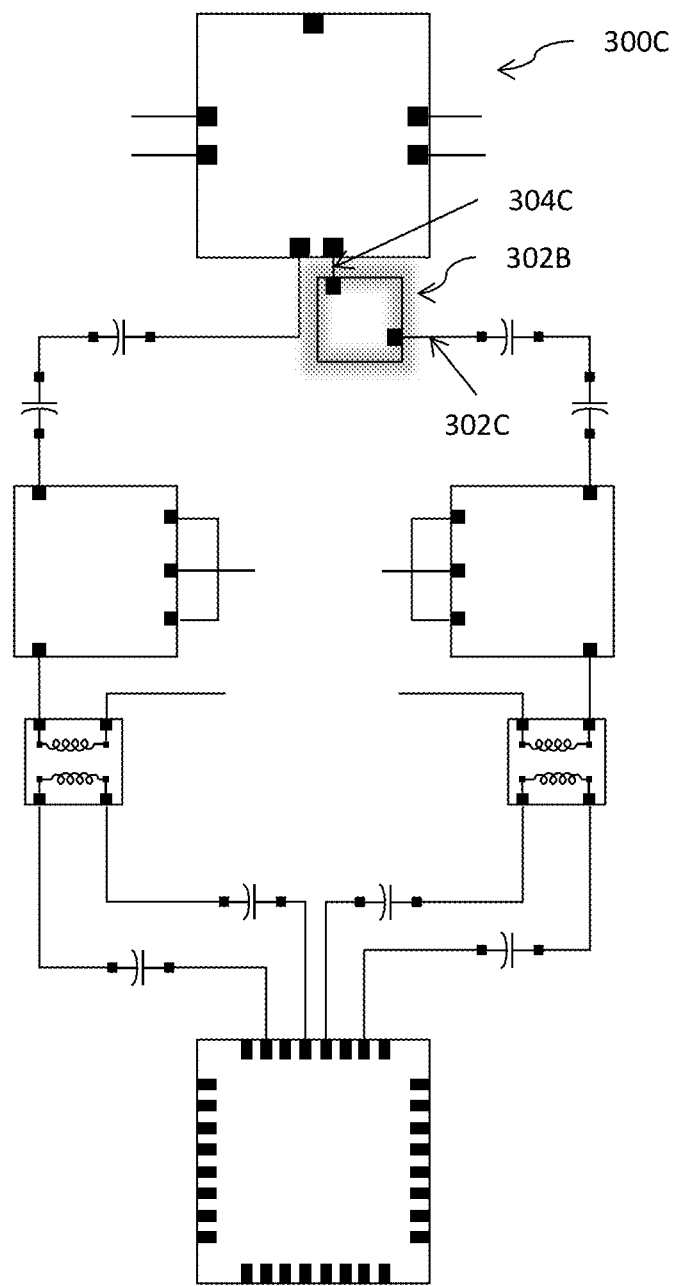
FIG. 3C illustrates an example of an extracted view including a model that represents a schematic circuit component design of interest in one or more embodiments.

FIG. 3C illustrates an example of an extracted view including a model that represents a schematic circuit component design of interest in one or more embodiments. More specifically, FIG. 3C illustrates the example where the transmission line model 302B is placed and interconnected with straight flight-line segments 302C and 304C. A snapshot may be taken from this modified schematic design 300C and saved as an extracted view that may be referenced in back annotating the schematic design 300A.

Figure 3D:
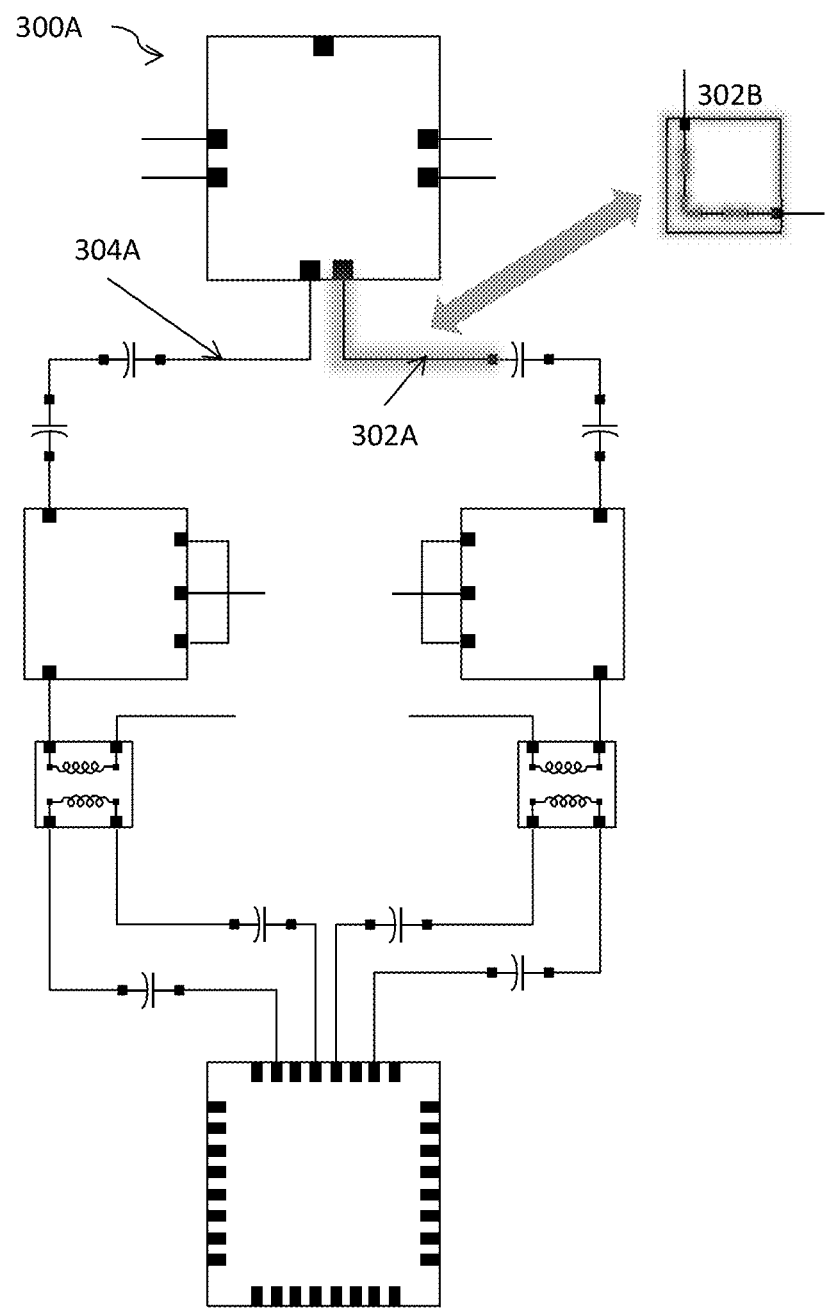
FIG. 3D illustrates an example of the schematic design illustrated in FIG. 3A that is bound to and annotated with some extracted view information from an extracted view in one or more embodiments.

FIG. 3D illustrates an example of the schematic design illustrated in FIG. 3A that is bound to and annotated with some extracted view information from an extracted view in one or more embodiments. More specifically, FIG. 3D illustrates that the schematic design 300A including the nets of interest 302A and 304A is back annotated with the extracted view (e.g., 300C in FIG. 3C) via binding the extracted view to the schematic design or vice versa. FIG. 3D also graphically illustrates the binding between the net of interest 302A and the corresponding model 302B (e.g., a transmission line model) that is used to represent the net 302A in the extracted view 300C.

The model 302B and/or information pertaining to the model 302B may be back annotated in the schematic design 300A in the form of annotations although it shall be noted that annotations in an electronic design may or may not necessarily always be shown in the user interface showing the electronic design. Rather, any of these annotations may be shown in the same user interface or in a separate user interface (e.g., a pop-up window, another electronic design user interface, etc.) on an on-demand basis. Moreover, FIGS. 3A and 3C-3D also illustrate that when one component is selected in one design abstraction, the selected component as well as its corresponding component may be graphically and/or textually emphasized. For example, when a user selects the net 302A in the schematic design 300A (in FIG. 3A or 3D), the bound model 302B may also be highlighted in the extracted view 300C in FIG. 3C and 302B in the schematic design 300A as shown in FIG. 3D if the schematic design is configured to shown the annotated models.

Figure 4A:
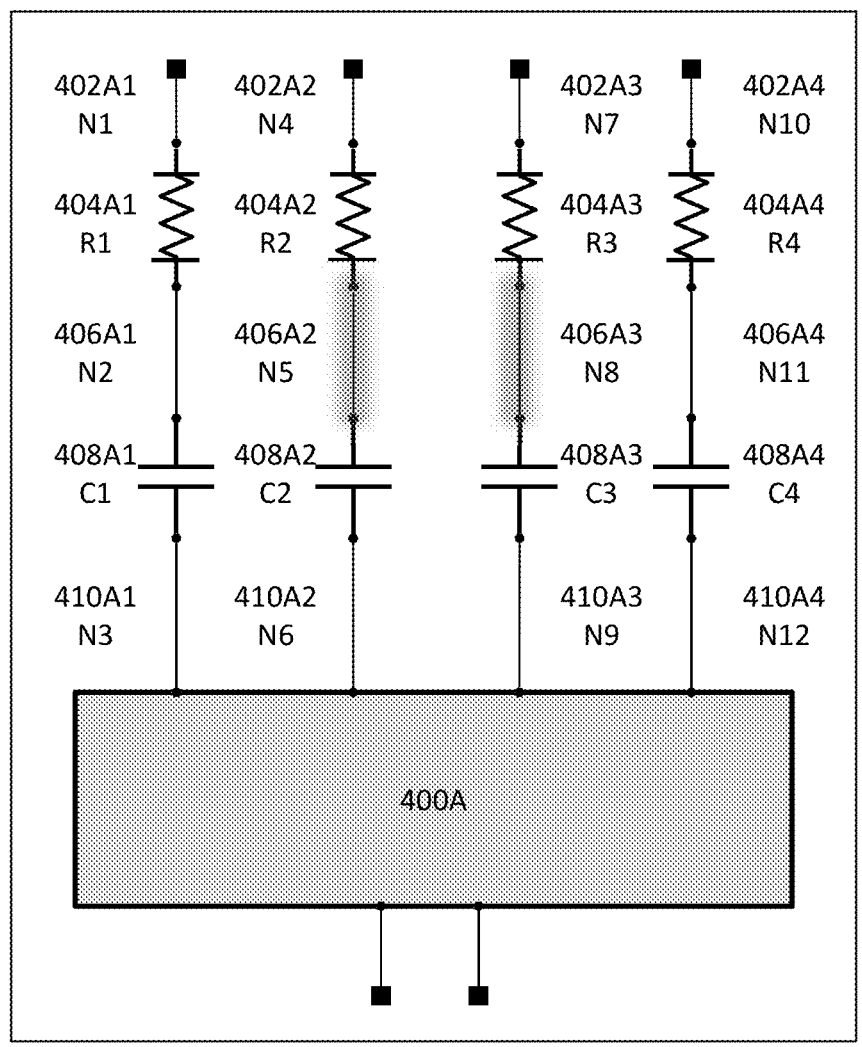
FIG. 4A illustrates an example of another schematic design that is to be bound to and annotated with extracted view information from an extracted view in one or more embodiments.

FIG. 4A illustrates an example of another schematic design that is to be bound to and annotated with extracted view information from an extracted view in one or more embodiments. In this example, the schematic design includes a schematic cell 400A that is operatively connected to four sets of schematic circuit component designs. Each set of schematic circuit component design includes a first net (e.g., 402A1 or the first net N1, 402A2 or the fourth net N4, 402A3 or the seventh net N7, and 402A4 or the tenth net N10) connected to a first resistor (e.g., 404A1 or the first resistor R1, 404A2 or the second resistor R2, 404A3 or the third resistor R3, and 404A4 or the fourth resistor R4) in series.

The first resistor in each set is further connected to a second net (e.g., 406A1 or the second net N2, 406A2 or the fifth net N5, 406A3 or the eighth net N8, and 406A4 or the eleventh net N11) which is in turned connected to a first capacitor (e.g., 408A1 or the first capacitor C1, 408A2 or the second capacitor C2, 408A3 or the third capacitor C3, and 408A4 or the fourth capacitor C4). The first capacitor in each set of schematic circuit component designs is then connected to the schematic cell 400A.

Figure 4B:
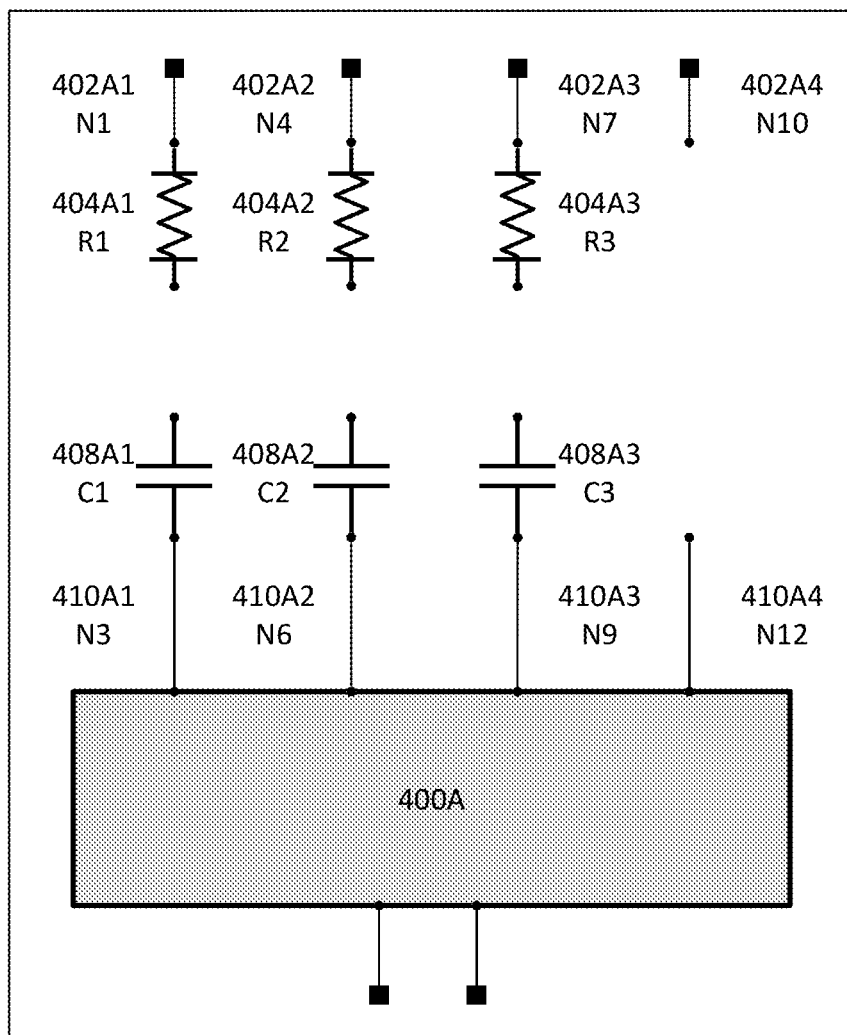
FIG. 4B illustrates an example of an intermediate stage during the generation of an extracted view for the schematic design illustrated in FIG. 4A in one or more embodiments.

FIG. 4B illustrates an example of an intermediate stage during the generation of an extracted view for the schematic design illustrated in FIG. 4A in one or more embodiments. More specifically, FIG. 4B illustrates an intermediate stage at which the schematic circuit component designs 406A1 (the second net N2), 406A2 (the fifth net N5), 408A3 (the eighth net N8), 404A4 (the fourth resistor R4), 406A4 (the eleventh net), and 408A4 (the fourth capacitor C4) are removed from the schematic design.

The schematic design symbols of the other schematic component designs are retained in the schematic design. The retention of a schematic design symbol in a schematic design may indicate that the schematic circuit component design is also retained in some embodiments, or that a model actually replaces the schematic circuit component design yet uses the same schematic symbol in some other embodiments. These removed schematic circuit component designs will be represented with models in the extracted view as described above.

Figure 4C:
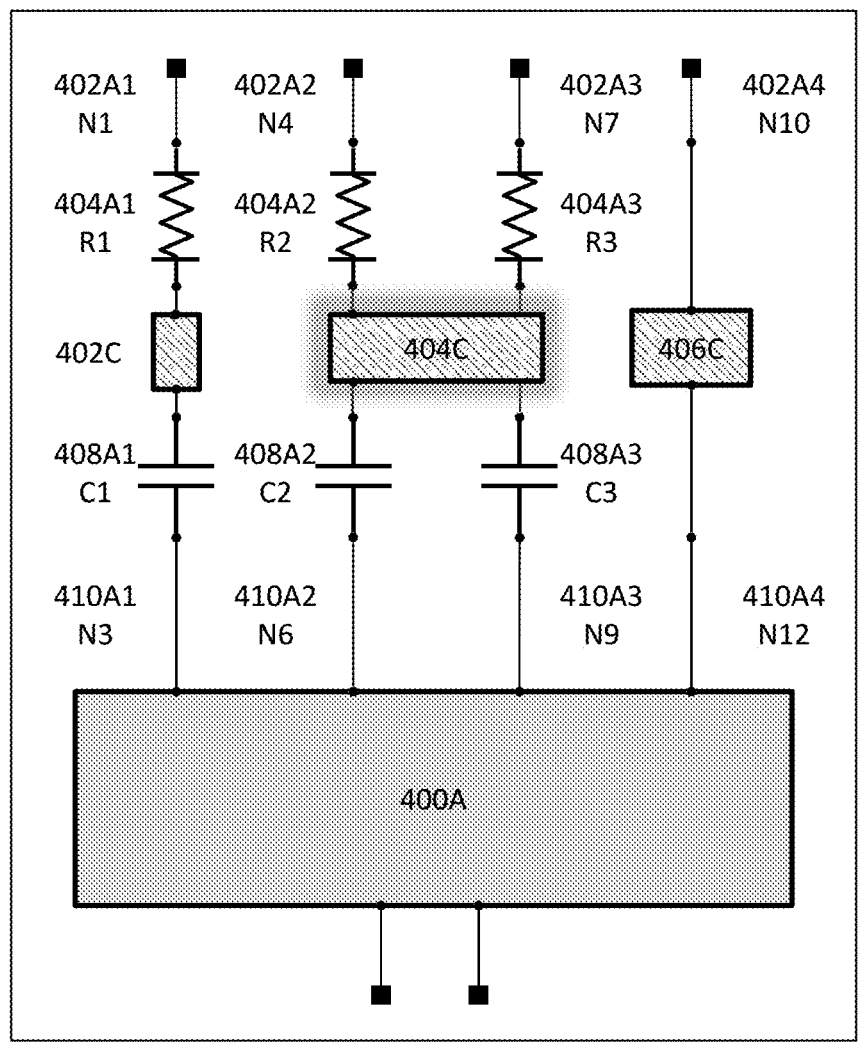
FIG. 4C illustrates an example of an extracted view that may be referenced in annotating the schematic design illustrated in FIG. 4A in one or more embodiments.

FIG. 4C illustrates an example of an extracted view that may be referenced in annotating the schematic design illustrated in FIG. 4A in one or more embodiments. In this example, three models 402C, 404C, and 406C are inserted and placed in the schematic design. For example, model 402C is inserted into the schematic design to replace net segment 406A1 (the second net N2); model 404C is inserted into the schematic design to replace net segment 406A2 (the fifth net N5) and net segment 406A3 (the eighth net N8); and model 406C is inserted into the schematic design to replace resistor 404A4 (the fourth resistor R4), the net segment 406A4 (the eleventh net N11), and capacitor 408A4 (the fourth capacitor C4).

In addition, each of these three models is properly interconnected with the corresponding portion of the schematic design by using connectivity information (e.g., schematic connectivity information and/or layout connectivity information) in an identical or substantially similar manner as described above with reference to the U.S. patent applications listed in the section entitled Cross Reference to Related Applications.

Figure 4D:
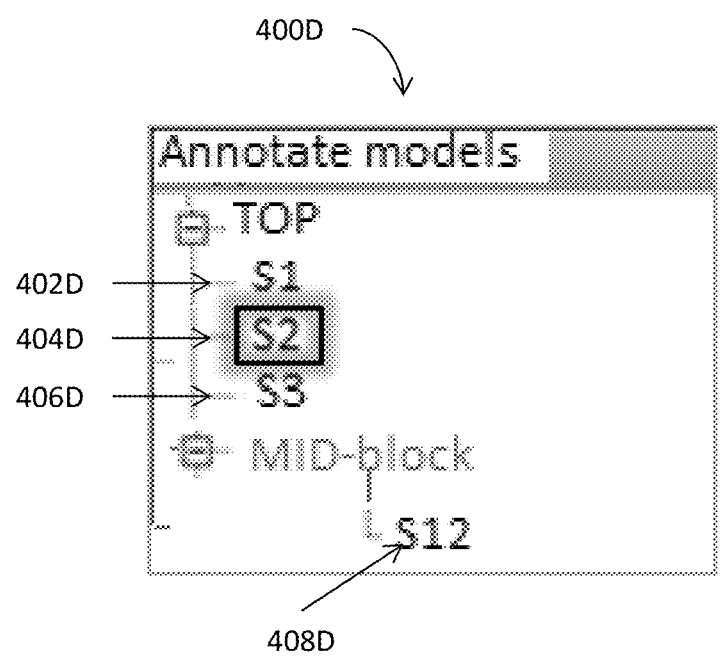
FIG. 4D illustrates an example of a model annotator dialogue window for annotation of and binding with an electronic design in one or more embodiments.

FIG. 4D illustrates an example of a model annotator dialogue window for annotation of and binding with an electronic design in one or more embodiments. In this example, the model annotator dialogue window 400D includes the models 402D, 404D, and 406D in the extracted view. This model annotator dialogue window 400D further illustrates the hierarchical structure of the extracted view where the three models S1 (402D), S2 (404D), and S4 (406D) are hierarchically placed under the hierarchy entitled "TOP". Moreover, this model annotator dialogue window 400D further illustrates optionally annotating a portion of the schematic design located at a specific hierarchy. For example, FIG. 4D illustrates that the "MID-block" hierarchy in the schematic design is also annotated with another model S12 (408D).

In addition, FIGS. 4A and 4C-4D also illustrate that when one component is selected in one design abstraction, the selected component as well as its corresponding component may be graphically and/or textually emphasized. For example, when a user selects the nets 406A2 and 406A43 in the schematic design (in FIG. 4A), the bound model 404C may also be highlighted in the extracted view in FIG. 4C and 404D in the model annotator 400D as shown in FIG. 4D. Alternatively, a user may select the model 404C in the extracted view illustrated in FIG. 4C (or the model "S2" (404D) in the model annotator 400D in FIG. 4D), and the corresponding schematic circuit component designs 406A2 and 406A4 may be identified via the binding information described above and graphically and/or textually emphasized in the schematic design illustrated in FIG. 4A.

As another working example of the binding between various abstractions of the electronic design, a user may probe, for example, the fifth net (N5) 406A2 that is incorporated into the model 404C as two of the four interfaces to the external circuitry. For example, a use may select the fifth net 406A2 and instruct the system to provide electrical behavior information such as a voltage value. The identification of the fifth net 406A2 corresponds to more than one candidate voltage values so the system cannot deterministically determine which voltage value to retrieve. In some embodiments, the system may further inquire into which end of the second net (the second resistor 404A2 end or the second capacitor 408A2 end) the user would like to obtain the electrical behavior information for. In some other embodiments, the disambiguation module may provide both voltages at both ends of the fifth net 406A2 in response to the identification of the fifth net. In some other embodiments, the disambiguation module may further provide transient behavior information (e.g., waveforms) and/or distribution of the requested information along the identified schematic circuit component design.

Figure 4E:
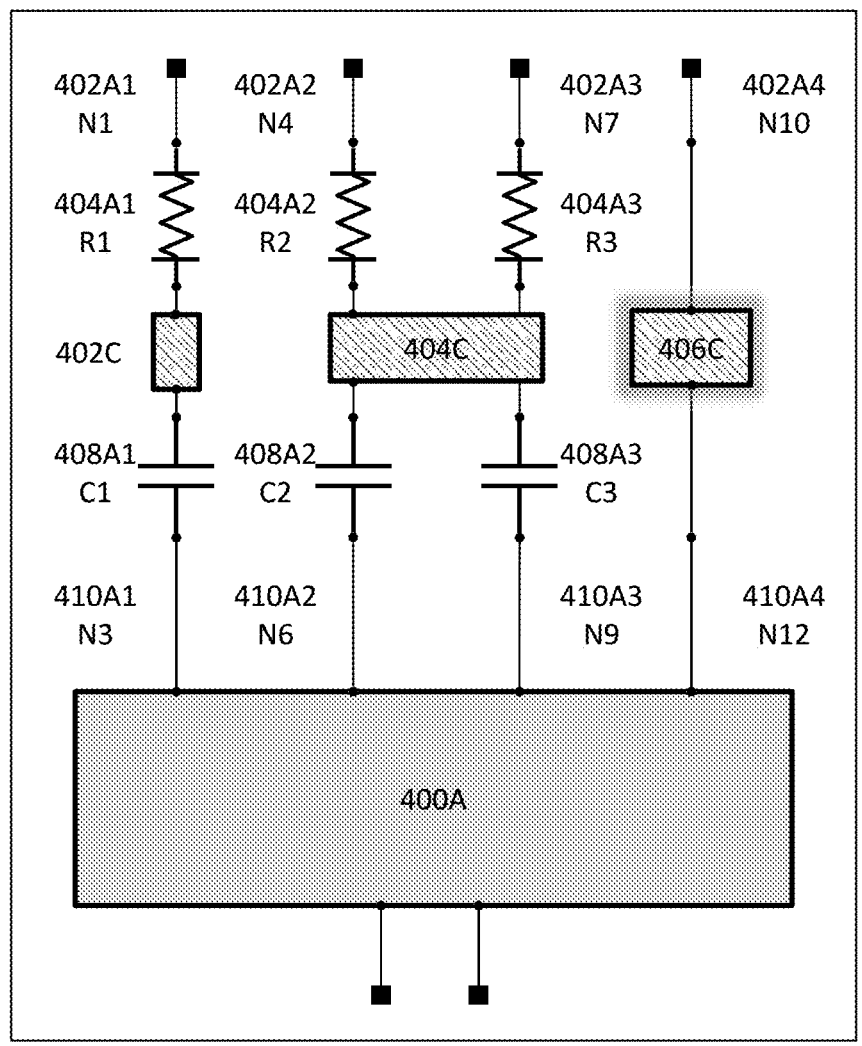
FIG. 4E illustrates an example of another extracted view that may be referenced for annotation of and binding with an electronic design in one or more embodiments.

FIG. 4E illustrates an example of another extracted view that may be referenced for annotation of and binding with an electronic design in one or more embodiments. More specifically, FIG. 4E illustrates the same extracted view as that illustrated in FIG. 4C.

Figure 4F:
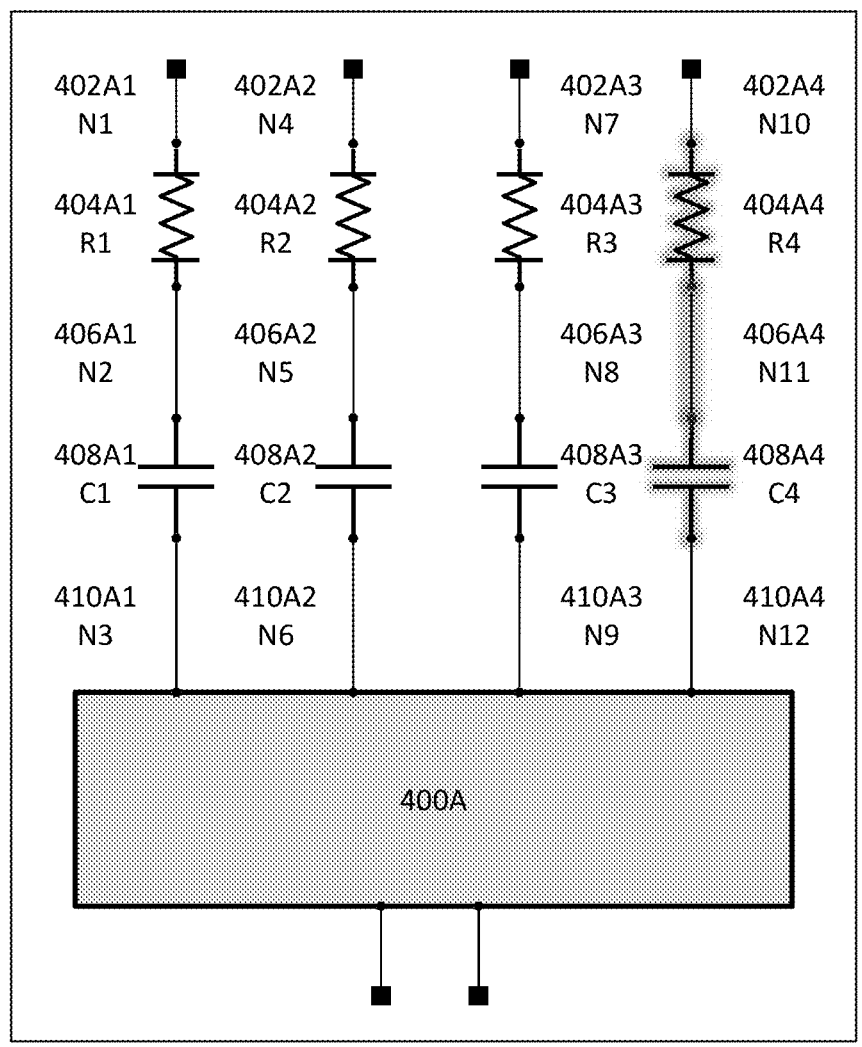
FIG. 4F illustrates an example of a simplified schematic design to which the model annotation and binding may be applied with reference to the extracted view illustrated in FIG. 4E in one or more embodiments.

FIG. 4F illustrates an example of a simplified schematic design to which the model annotation and binding may be applied with reference to the extracted view illustrated in FIG. 4E in one or more embodiments. More specifically, FIG. 4F illustrates the same schematic design as that illustrated in FIG. 4A described above.

Figure 4G:
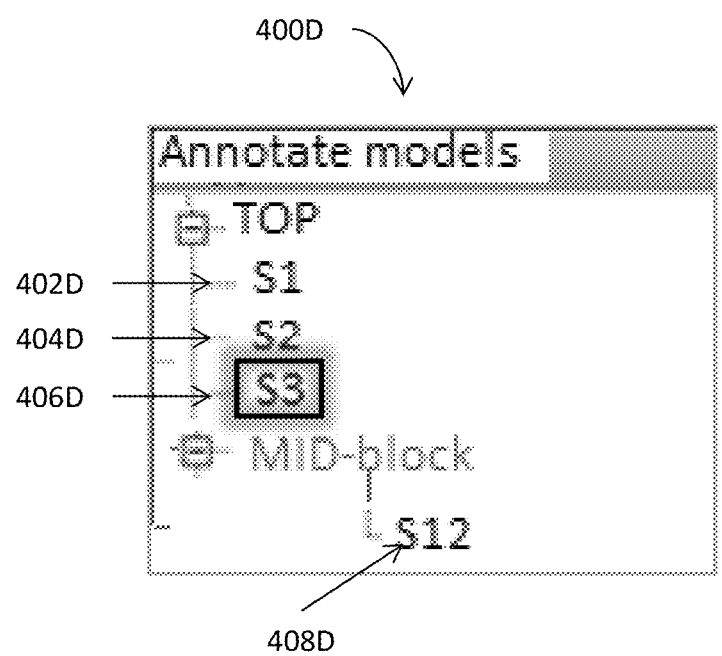
FIG. 4G illustrates an example of a simplified model annotation browser for the extracted view illustrated in FIG. 4E and the simplified schematic design illustrated in FIG. 4F in one or more embodiments.

FIG. 4G illustrates an example of a simplified model annotation browser for the extracted view illustrated in FIG. 4E and the simplified schematic design illustrated in FIG. 4F in one or more embodiments. More specifically, FIG. 4G illustrates the same model annotator 400D as illustrated in FIG. 4D described above.

In this example, FIGS. 4E-4G further illustrate that that when one component is selected in one design abstraction, the selected component as well as its corresponding component may be graphically and/or textually emphasized. In this example, a user selects one or more of the schematic circuit components 404A4, 406A4, and 408A4 in the schematic design (in FIG. 4F), the corresponding model 406C may also be highlighted in the extracted view in FIG. 4E and 406D in the model annotator 400D as shown in FIG. 4G. Alternatively, a user may select the model 406C in the extracted view illustrated in FIG. 4E (or the model "S3" (406D) in the model annotator 400D in FIG. 4G), and the corresponding schematic circuit component designs 404A4, 406A4, and 408A4 may be identified via the binding information described above and graphically and/or textually emphasized in the schematic design illustrated in FIG. 4F.

As another working example of the binding between various abstractions of the electronic design, a user may probe, for example, the eleventh net (N11) 406A4 that is fully enclosed in the model 406C as two of the four interfaces to the external circuitry. For example, a use may select the eleventh net 406A4 and instruct the system to provide electrical behavior information such as a voltage value. Nonetheless, the built-in intelligence of the error handling process may find that this identified net for probing is fully enclosed in the model 406C and is thus not an appropriate target for probing by using, for example, the type of the identified schematic circuit component design (a net) and the action to be performed (a probing action). The error handling process may issue a warning message to so indicate in some embodiments. In some other embodiments, the error handling process may further invoke an extracted view module to display at least the pertinent portion of the corresponding model or model components.

Figure 4H:
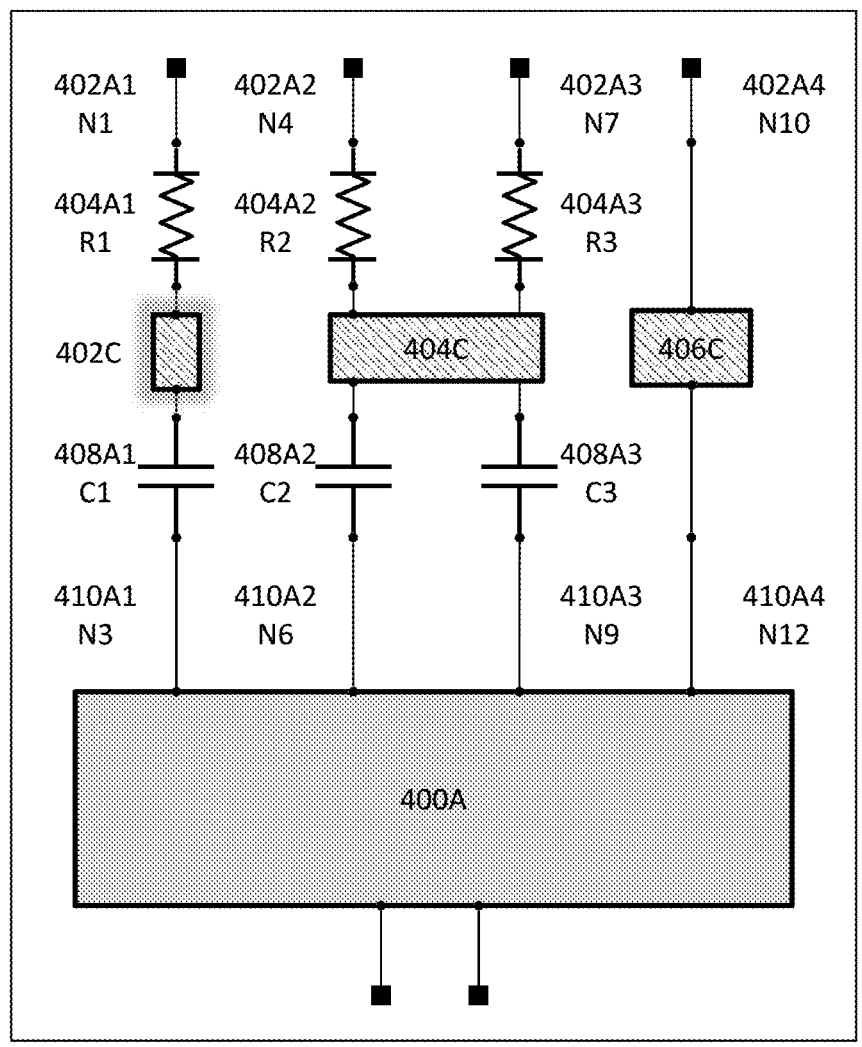
FIG. 4H illustrates another example of another extracted view that may be referenced for annotation of and binding with an electronic design in one or more embodiments.

FIG. 4H illustrates another example of another extracted view that may be referenced for annotation of and binding with an electronic design in one or more embodiments. More specifically, FIG. 4H illustrates the same extracted view as that illustrated in FIG. 4C or 4E.

Figure 4I:
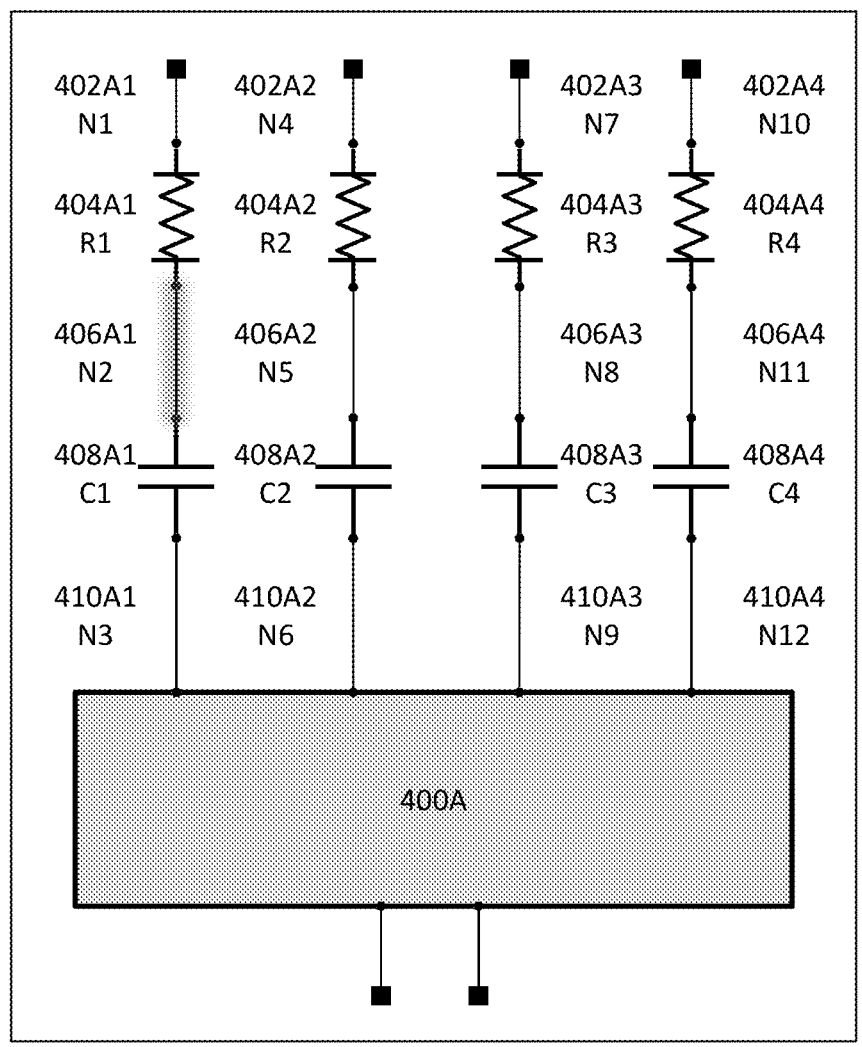
FIG. 4I illustrates another example of a simplified schematic design to which the model annotation and binding may be applied with reference to the extracted view illustrated in FIG. 4H in one or more embodiments.

FIG. 4I illustrates another example of a simplified schematic design to which the model annotation and binding may be applied with reference to the extracted view illustrated in FIG. 4H in one or more embodiments. More specifically, FIG. 4I illustrates the same schematic design as that illustrated in FIG. 4A or 4F described above.

Figure 4J:
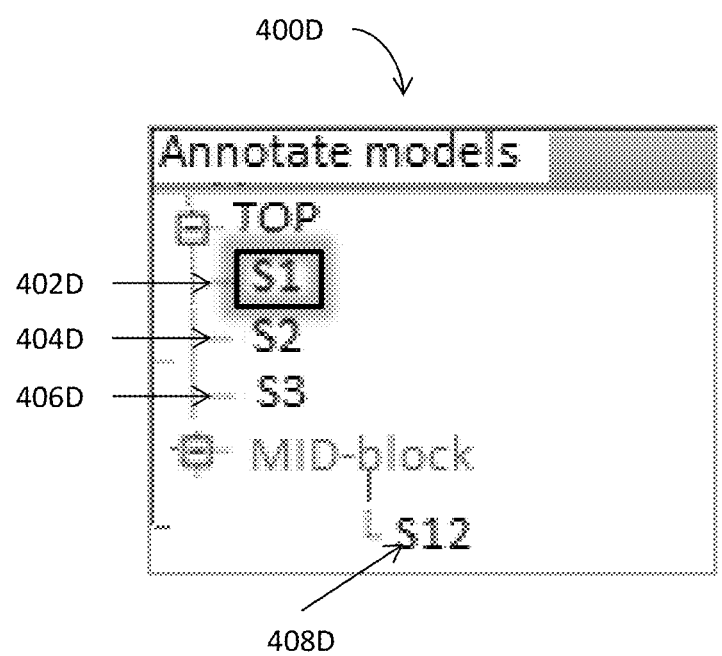
FIG. 4J illustrates another example of a simplified model annotation browser for the extracted view illustrated in FIG. 4H and the simplified schematic design illustrated in FIG. 4I in one or more embodiments.

FIG. 4J illustrates another example of a simplified model annotation browser or model annotator for the extracted view illustrated in FIG. 4H and the simplified schematic design illustrated in FIG. 4I in one or more embodiments. More specifically, FIG. 4J illustrates the same model annotator 400D as illustrated in FIG. 4D or 4G described above.

In this example, FIGS. 4H-4J further illustrate that that when one component is selected in one design abstraction, the selected component as well as its corresponding component may be graphically and/or textually emphasized. In this example, a user selects one or more of the schematic circuit component 406A1 in the schematic design (in FIG. 4I), the corresponding model 402C may also be highlighted in the extracted view in FIG. 4H and 402D in the model annotator 400D as shown in FIG. 4J. Alternatively, a user may select the model 402C in the extracted view illustrated in FIG. 4H (or the model "S1" (402D) in the model annotator 400D in FIG. 4J), and the corresponding schematic circuit component design 406A1 may be identified via the binding information described above and graphically and/or textually emphasized in the schematic design illustrated in FIG. 4I.

As another working example of the binding between various abstractions of the electronic design, a user may probe, for example, the second net (N2) 406A1 that is incorporated into the model 402C as interfaces to the external circuitry. For example, a use may select the second net 406A1 and instruct the system to provide electrical behavior information such as voltage value. The identification of the second net 406A1 corresponds to more than one candidate voltage values so the system cannot deterministically determine which voltage value to retrieve.

In some embodiments, the system may further inquire into which end of the second net (the first resistor end or the first capacitor end) the user would like to obtain the electrical behavior information for. In some other embodiments, the disambiguation module may provide both voltages at both ends of the second net 406A1 in response to the identification of the second net. In some other embodiments, the disambiguation module may further provide transient behavior information (e.g., waveforms) and/or distribution of the requested information along the identified schematic circuit component design. On the other hand, if a user simply probes a pin in the schematic design, and the pin corresponds to a single physical pin, the system may retrieve the voltage value at the physical pin from the analysis results and return the retrieved voltage value.

Figure 4K:
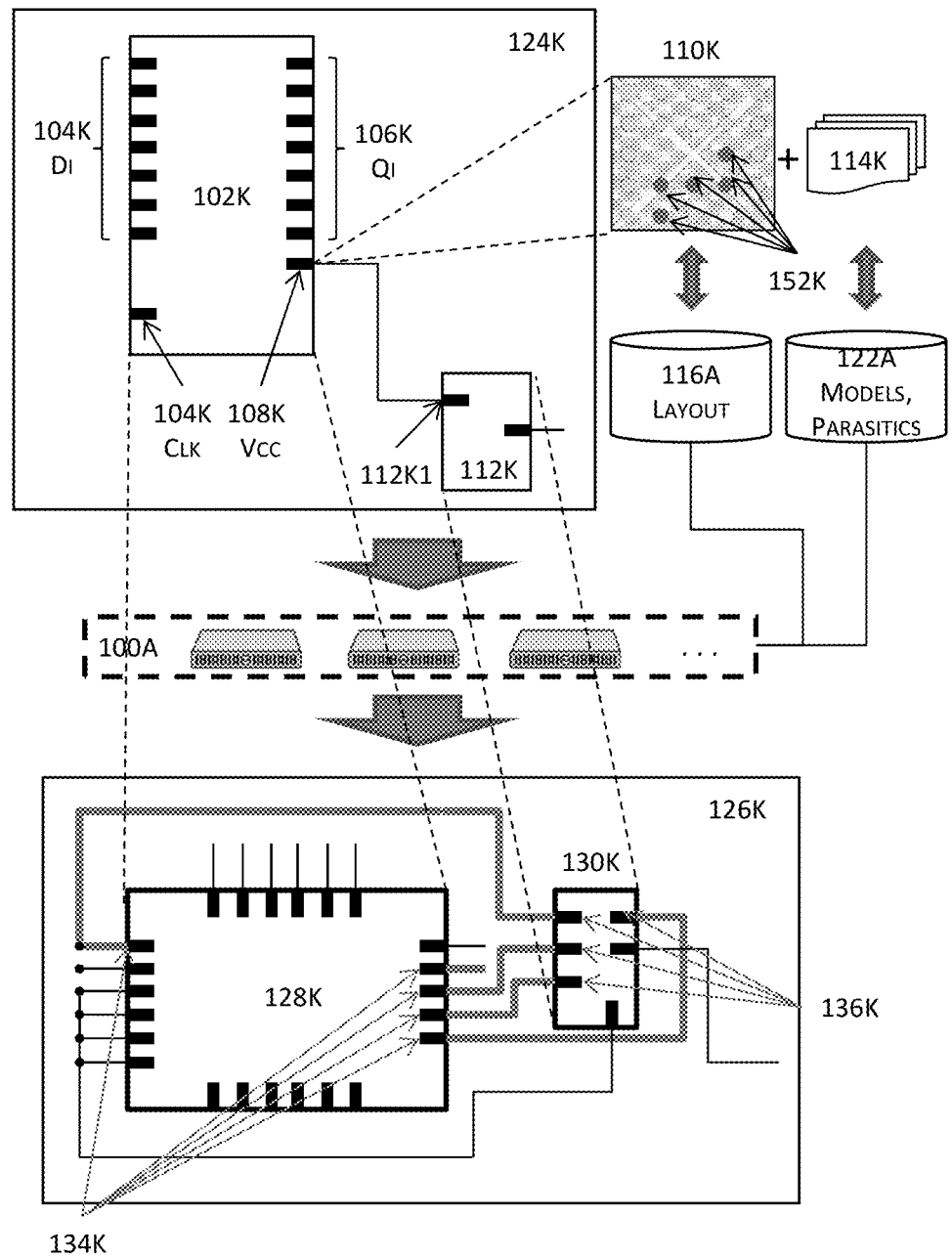
FIG. 4K illustrates an example of a schematic design and an extracted view that may be referenced for annotation of and binding with the schematic design in one or more embodiments.

FIG. 4K illustrates an example of a schematic design and an extracted view that may be referenced for annotation of and binding with the schematic design in one or more embodiments. In this example, the schematic design includes a single logical pin for the Vcc pin 108K for the first cell 124K and a single power pin for the second cell 126K. The one or more computing systems 100A may invoke, for example, one or more extracted view modules 120A to examine, for example, the layout connectivity information 110K or the optional electrical information 114K that shows the Vcc pin is actually distributed among a plurality of physical pins 152K. Similarly, the one or more computing systems may also determine that the single logical power pin 112K1 is also distributed among a plurality of actual, physical pins.

These one or more computing systems 100A may create a first symbol for representing the first cell as a first model in an extracted view and a second symbol for representing the second cell as a second model in the extracted view. In some embodiments, a symbol may be created anew, whereas a symbol may be modified from an existing symbol (e.g., a schematic symbol of the first cell or the second cell). A symbol includes appropriate interfaces to connect the model to the remaining portion of the electronic design. In this example illustrated in FIG. 4K, the first symbol 128K is created for the first cell 102K and includes five Vcc pins 134K that respectively correspond to the five actual, physical pins 152K. The second symbol 130K is also created for the second cell 112K and includes four power pins 136K instead of a single logical pin 112K1 as in the original schematic design.

Although FIG. 4K does not show, a symbol or even an extracted view including the symbol may be further annotated with additional textual and/or graphical information comprising, for example, the identifiers of circuit component designs, physical, geometric, and/or electrical properties of circuit component designs, etc. The original schematic circuit component designs (102K and 112K) may be removed; and these symbols (128K and 130K) may be placed in the schematic design.

These symbols may further be interconnected with pertinent connectivity information using flight-line segments, orthogonal line segments, or a combination of one or more flight-line segments and orthogonal line segments. In some embodiments, these symbols may be interconnected with schematic connectivity information. In some other embodiments, these symbols may be interconnected with layout connectivity information. In other embodiments, one or more of these symbols may be interconnected with schematic connectivity information, and one or more remaining symbols may be interconnected with layout connectivity information. An extracted view 126K may then be stored at least temporarily in a volatile memory (e.g., random access memory) in some embodiments or persistently in a storage device (e.g., a disk drive). It shall be noted that an electronic design may concurrently correspond to more than one extracted views each of which is bound or associated with the single schematic design, the layout design, and the circuit component designs thereof.

With the extracted view 126K, a binding may be established between the extracted view and the schematic design 124K (or the electronic design in another extraction such as the layout). Moreover the schematic design 124K may be back annotated with extracted view information pertaining to the extracted view 126K. Some examples of such extracted view information that may be back annotated into schematic designs are provided in FIG. 4L described below.

Figure 4L:
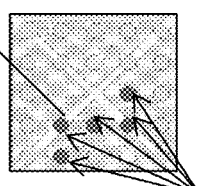
FIG. 4L illustrates some examples of extracted view information that may be annotated with or bound to an electronic design in one or more embodiments.
Figure 4L:
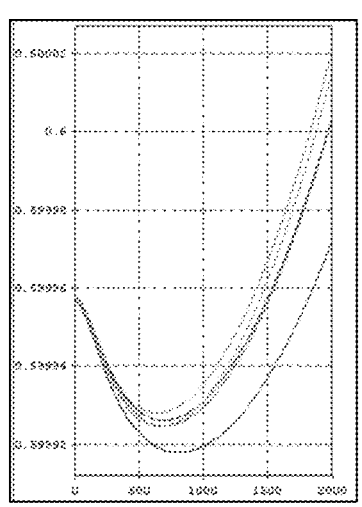

FIG. 4L illustrates some examples of extracted view information that may be annotated with or bound to an electronic design in one or more embodiments. These examples of extracted view information that may be associated with or annotated in an electronic design may include electrical, physical, and/or geometric information of circuit component designs in the electronic design in some embodiments. In addition or in the alternative, these examples may include information pertaining to the layout 110K such as the power pin information 404L in a listing 402L of circuit component designs pertaining to the physical pins 152K that may be represented as a single logical pin in the schematic design.

Analysis results 406L at various nodes or along various circuit component designs in the electronic circuit design may also be associated with or annotated in the corresponding nodes or portions of the electronic design. Moreover, the models 408L (e.g., s-parameter models, transmission line models, IBIS models, SPICE sub-circuits, etc.) or information pertaining to the models may also be associated with or annotated in the electronic design.

Any of the annotated information may be presented either in the electronic design (e.g., a schematic design) within close proximity of the corresponding circuit components or models or in a separate user interface. These annotations can be further categorized into a plurality of classes and even sub-classes (e.g., "physical", "electrical", "parasitic", "waveforms", etc.) so that the presentation of each class and sub-class may be individually configured to be displayed or hidden in one or more user interfaces to avoid overly cluttering these one or more user interfaces.

In addition, an electronic design may correspond to one or more extracted views; and a node or a circuit component design (e.g., a schematic instance, a layout instance, etc.) may be annotated with multiple values. For example, multiple analyses may be performed on different extracted views having different models representing the same or different circuit component designs therein. These multiple analyses thus provide analysis results having different accuracy. Some or all of these multiple analyses results may be annotated in the electronic design (e.g., a schematic design) in some embodiments. In some of these embodiments, the most accurate result will be annotated in the electronic design.

Some embodiments described herein provide schematic extracted views, bind a schematic extracted view with the schematic design, and enable the user to view, manipulate, and probe the schematic design with the full knowledge and awareness of the extracted view while the links or association between extracted views and the corresponding layouts as well as the links or association between the extracted views and the schematic are preserved. These extracted views no longer have flat file structures as conventional extracted views do. Instead, these extracted views are generated and placed according to the hierarchies of the circuit component designs these extracted views represent.

As a result, the extracted views may be arranged in a hierarchical data structure where a parent (e.g., a model in an extracted view) at a higher hierarchy may include one or more child circuit components at one or more lower hierarchies. Moreover, a model in an extracted view may be bound to or associated with the circuit component designs that are modeled in the model; and this model may be hierarchically placed in the hierarchical structure according to the hierarchical structure of the underlying electronic design. This hierarchical structure of an extracted view may be presented in a window that enables a user to select any entity (e.g., a model) at a hierarchy and expand or collapse the hierarchy to view or hide its constituents.

When a user selects an entity from the hierarchical structure, the circuit component design(s) in the schematic design corresponding to the selected entity may be highlighted or emphasized in the schematic design window. For example, a user may select a model in the hierarchical structure, and the schematic circuit component designs that correspond to this selected model may be graphically and/or textually emphasized in the schematic design window that may be further optionally zoomed to an appropriate level to show the emphasized schematic circuit component designs. In some embodiments where the extracted view is also showed (e.g., in a separate extracted view window), the model may also be shown in the extracted view. In other words, the hierarchical structure, the schematic design, the schematic design database or data structure, the extracted view(s) may be correlated with one another so that the identification or selection of one entity in one may also be reflected in the others.

In this manner, a user may visualize which schematic circuit component designs have been represented as a specific model in the extracted view, and which schematic circuit component designs have not been represented as models in the extracted view. A model is generated not only for illustrating graphical resemblance with the schematic circuit component designs for which the model is generated but also for providing more information and more accurate information to simulation engines (e.g., an electromagnetic solver) so that the simulation engines may more accurately predict the behaviors therefor. That is, a model described herein is generated with graphical resemblance with the corresponding schematic circuit component designs as well as the layout components or information therefor while reducing or minimizing the impact on the graphical resemblance due to the introduction of layout components. Some embodiments allow a user to pick and choose when and where in the schematic design more accurate simulation results are to be computed.

For example, a user may determine that a specific, smaller portion of a schematic design is of particular interest and thus need more accurate electrical behavior. In this example, the user may invoke the processes described herein to generate a model for these schematic circuit component designs and an extracted view including at least this model for the schematic design. This extracted view may nevertheless include schematic circuit component designs for which more accurate electrical behavior is not needed or desired and thus have not been represented as model(s). This extracted view may then be provided to a simulation engine that solves for the predicted electrical behavior where the specific, smaller portion represented by the model is more accurately modeled, yet another portion in the extracted view may not. The simulated electrical behavior is thus more accurate in the specific, smaller portion and may deviate more in another portion of the schematic design.

Moreover, representing a group of schematic circuit component designs as a model may be performed on the fly as permitted by the computational power and resources. Should the user decide that certain schematic circuit component designs are to be represented as a model (e.g., more accurate simulation results are required or desired for these schematic circuit component designs), the user may invoke the processes on the fly to create an extracted view for the schematic design having one or more models representing these schematic circuit component designs and send the extracted view to a simulation engine to obtain simulation results with different granularities or different levels of accuracy.

In this way, depending on the availability of computational resources and/or the objectives of predicting the electrical behavior of an electronic design. For example, electrical behaviors with high accuracy may not be needed for concept and feasibility studies, and the extracted view may not need as many models representing the schematic circuit component designs in the schematic design. On the other hand, electrical behaviors before or during the layout implementation, for layout-versus-schematic check, or before post-layout optimization may require higher accuracy, and the extracted view therefor may thus include more models representing various schematic circuit component designs.

An extracted view may be generated from the schematic as well as the layout generated from the schematic in such a way to preserve or at least resemble, to the extent possible, the graphical nature of the schematic design in some embodiments. This extracted view may be used to back annotate the schematic design from which the extracted view is created. Furthermore, a model may be generated for one or more schematic circuit components (e.g., a trace, a resistor, a capacitor, an IC, or combinations thereof, etc.) based at least in part upon the one or more corresponding layout circuit components to model, for example, more correct parasitic, physical, and/or electrical characteristics. In some embodiments, a model may be generated as a transmission line model that may be further broken down into a network of inductance, capacitance, and/or resistance element(s).

A symbol may be generated for the model. This symbol may be generated with the same number of connection points or logical pins that the original, one or more schematic circuit component designs use to interface with the remaining portion of the schematic design. The original connections between the one or more schematic circuit component designs in the schematic as well as the one or more schematic circuit component designs may be removed from the schematic design. The generated symbol may then be placed in lieu of these original one or more schematic circuit design components.

In this simplified example having only one model representing one or more schematic circuit component designs, a schematic view may be generated, and the schematic design may then be associated with the model. This association between the schematic design and the model may be explicit as shown in the extracted view of the schematic design or implicit where the users still see the original schematic design although the one or more components in the schematic design have been represented with the model to simulation engines. Regardless of the implicit or explicit nature of this association, the user may choose whether the user would like to see the original schematic design or the extracted view that shows the model in place of the one or more schematic circuit component designs; and the binding or association between the one or more schematic circuit component designs (and hence the schematic design) and the model always exist.

This extracted view may then be presented to a simulation engine that solves for the electrical behavior of this extracted view by using the model. It shall be noted that this simplified example includes only one model for the ease of explanation and description although more models representing more schematic circuit component designs may also be included in one or more other extracted views. That is, a schematic design may correspond to multiple extracted views each of which may include a different number of models representing their respective schematic circuit component designs.

The simulation engine may then predict the behavior of the schematic design. In some embodiments where the binding and association are implicit so the user operates directly on the schematic design, it shall be noted that although the user may still see the one or more schematic circuit component designs represented by the model, the behaviors of these one or more schematic circuit component designs are determined by the model. In other words, if the user probes anywhere along the one or more schematic circuit component designs, the corresponding solution (e.g., predicted behavior) is provided by the model.

As described above, a schematic design may be associated or bound with one or more extracted views each of which may include a different number of models representing respective schematic circuit component designs. With an extracted view bound to a schematic design, a designer may probe the schematic design, and the claimed embodiments may identify the point or portion corresponding to the probing point or portion in the schematic design from the bound or associated extracted view and retrieve and present the simulation results therefor to the designer even when the designer is directly operating on the schematic design without showing the extracted view.

In some embodiments where a designer probes a point in a schematic design, the claimed embodiments may react differently, depending upon where the probing point is. For example, when a designer probes a pin in the schematic design, the claimed embodiments will show the electrical behaviors from the simulation engine for the corresponding pin in the extracted view. When a designer probes a logic VDD, VCC, or GND pin in the schematic design, the claimed embodiments may bring up the corresponding detailed pin map that allow user either to view the desired electrical behavior of all the physical pins associated with the probed logic VDD, VCC, or GND pin in some embodiments or to select a physical pin from the plurality of distributed physical pins and view the desired electrical behavior therefor.

When a designer probes a net in the schematic design, the claimed embodiments may show the desired electrical behavior (e.g., current, voltage values, etc.) for the corresponding net obtained from the extracted view. When a designer probes a device or a net in the schematic design, and the device or net is fully included in a model in the extracted view, there will be no nodes for probing in the extracted view due to the full inclusion of the device or net in the model. Therefore, a message may show to indicate that probing at the selected point or entity is not possible. On the other hand, probing a net or device that is replaced by a model in the extracted view may bring up a dialogue box asking the designer to select which side of the net or device is to be probed. The claimed embodiments thus enable users to probe waveforms from the schematic design, with or without showing the extracted view to the users.

System Architecture Overview

Figure 5:
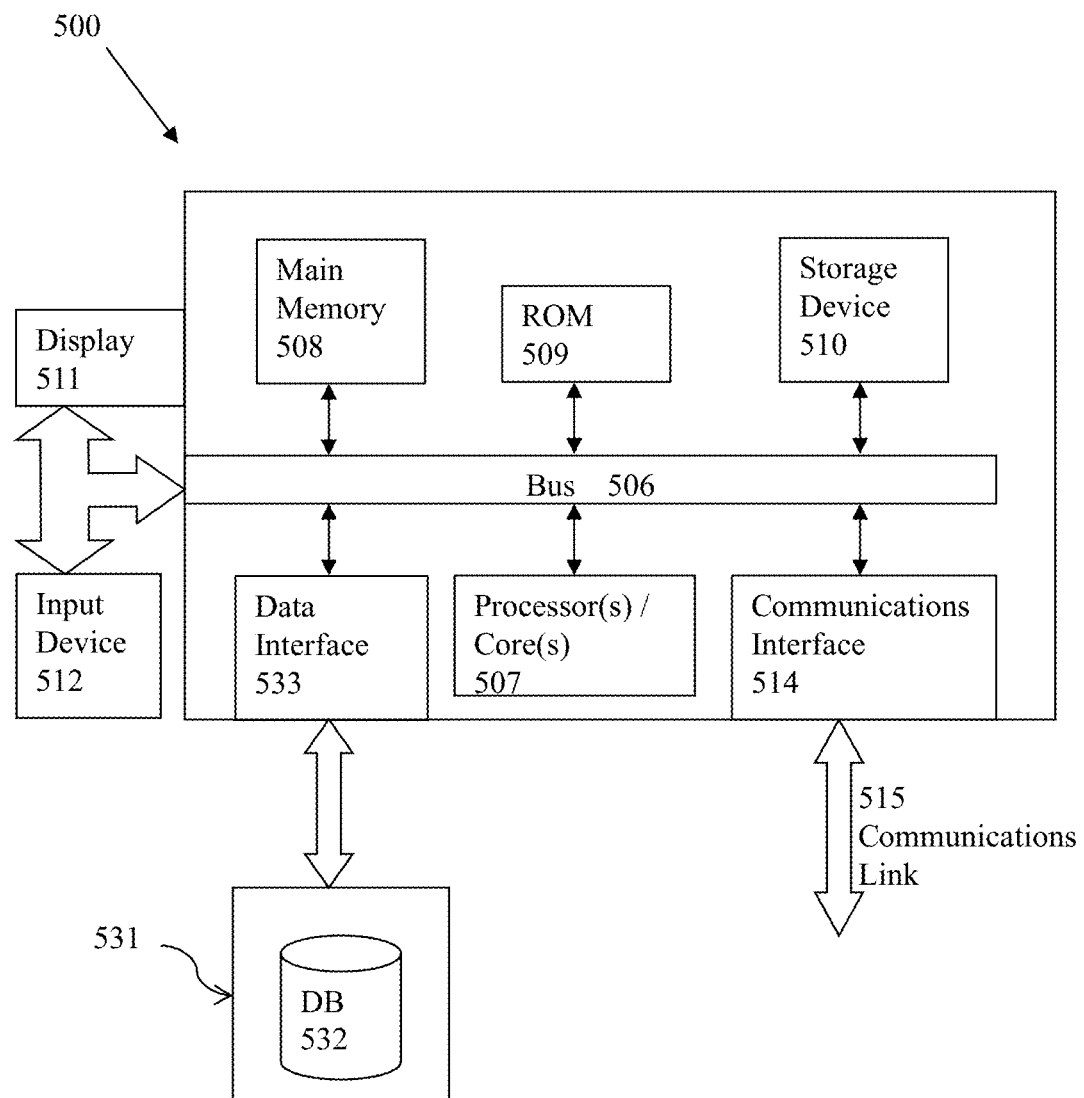
FIG. 5 illustrates a computerized system on which a method for binding and annotating an electronic design with a schematic driven extracted view may be implemented.

FIG. 5 illustrates a computerized system on which a method for binding and annotating an electronic design with a schematic driven extracted view may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for binding and annotating an electronic design with a schematic driven extracted view, comprising:
    identifying a schematic design and an extracted view of an electronic design;
    binding the schematic design or a portion of the schematic design with the extracted view and storing binding information pertaining to binding the schematic design or the portion with the extracted view in a data structure, wherein
        the extracted view comprises a schematic symbol of a first schematic component design and a model, and
        the extracted view is generated at least by removing the first schematic component design from the schematic design and further by replacing the first schematic component design in the schematic design with the model;
    annotating, at an extracted view module stored at least partially in memory of and functioning in conjunction with a microprocessor of a computing system, the schematic design with extracted view information pertaining to the extracted view based at least in part upon the binding information; and
    generating a response to a user action based at least in part upon the extracted view information or the binding information.

2. The computer implemented method of claim 1, further comprising identifying a layout of the electronic design, wherein the user action comprises a probing action that obtains one or more electrical characteristics of the schematic design.

3. The computer implemented method of claim 1, generating the response to the user action comprising:
    identifying a first user selection of a first schematic circuit component design in the schematic design; and
    emphasizing a first model corresponding to the first schematic circuit component design in the extracted view or a model tree structure in response to the first user selection.

4. The computer implemented method of claim 3, generating the response to the user action further comprising:
    identifying a second user selection of a second model in the extracted view; and
    emphasizing a second schematic circuit component design corresponding to the second model in the schematic design or a schematic design tree structure in response to the second user selection.

5. The computer implemented method of claim 1, generating the response to the user action comprising:
    identifying a schematic circuit component design corresponding to the user action;
    identifying a model corresponding to the schematic circuit component design from the extracted view; and
    determining a type for the schematic circuit component design.

6. The computer implemented method of claim 5, generating the response to the user action comprising:
    identifying a point of interest in the schematic design based in part or in whole upon the type or the model that corresponds to the schematic circuit component design;
    identifying one or more electrical characteristics at the point of interest by using at least the extracted view; and
    presenting the one or more electrical characteristics in a user interface.

7. The computer implemented method of claim 6, generating the response to the user action comprising:
    performing disambiguation processing in response to the user action based at least in part upon the type for the schematic circuit component design.

8. The computer implemented method of claim 6, generating the response to the user action comprising:
    performing error handling processing in response to the user action based at least in part upon the type for the schematic circuit component design.

9. A system for binding and annotating an electronic design with a schematic driven extracted view, comprising:
    non-transitory computer accessible storage medium storing thereupon program code;
    at least one micro-processor of one or more computing systems that is configured to execute the program code to identify a schematic circuit and an extracted view of an electronic design;
    the at least one micro-processor of one or more computing systems that is further configured to bind the schematic design or a portion of the schematic design with the extracted view and store binding information pertaining to binding the schematic design or the portion with the extracted view in a data structure, wherein the extracted view comprises a schematic symbol of a first schematic component design and a model, and the extracted view is generated at least by removing the first schematic component design from the schematic design and further by replacing the first schematic component design in the schematic design with the model;

an extracted view module that is stored at least partially in memory of the one or more computing systems, includes or functions in conjunction with the at least one micro-processor of the one or more computing systems, and is configured to execute the program code to annotate the schematic design with extracted view information pertaining to the extracted view based at least in part upon the binding information; and the at least one micro-processor of one or more computing systems further configured to generate a response to a user action based at least in part upon the extracted view information or the binding information.

10. The system for claim 9, wherein the at least one microprocessor executing the program code to generate the response to the user action is further configured to:

identify a first user selection of a first schematic circuit component design in the schematic design; and emphasize a first model corresponding to the first schematic circuit component design in the extracted view or a model tree structure in response to the first user selection.

11. The system for claim 10, wherein the at least one microprocessor executing the program code to generate the response to the user action is further configured to:

identify a second user selection of a second model in the extracted view; and emphasize a second schematic circuit component design corresponding to the second model in the schematic design or a schematic design tree structure in response to the second user selection.

12. The system for claim 9, wherein the at least one microprocessor executing the program code to generate the response to the user action further executes the program code to:

identify an interconnect from the schematic design; and identify one or more characteristics of the interconnect, the one or more characteristics comprising signal rise time, one-way signal propagation time delay, an inductive impedance, or a resistance.

13. The system for claim 9, wherein the at least one microprocessor executing the program code to identify the schematic circuit component design further executes the program code to:

identify a schematic circuit component design corresponding to the user action;

identify a model corresponding to the schematic circuit component design from the extracted view; and determine a type for the schematic circuit component design.

14. The system for claim 13, wherein the at least one microprocessor executing the program code to identify the schematic circuit component design further executes the program code to:

identify a point of interest in the schematic design based in part or in whole upon the type or the model that corresponds to the schematic circuit component design;

identify one or more electrical characteristics at the point of interest by using at least the extracted view;

present the one or more electrical characteristics in a user interface; and perform disambiguation processing in response to the user action based at least in part upon the type for the schematic circuit component design.

15. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for binding and annotating an electronic design with a schematic driven extracted view, the set of acts comprising:

identifying a schematic circuit and an extracted view of an electronic design;

binding the schematic design or a portion of the schematic design with the extracted view and storing binding information pertaining to binding the schematic design or the portion with the extracted view in a data structure, wherein the extracted view comprises a schematic symbol of a first schematic component design and a model, and the extracted view is generated at least by removing the first schematic component design from the schematic design and further by replacing schematic component design in the schematic design with the model;

annotating, at an extracted view module stored at least partially in memory of and functioning in conjunction with a microprocessor of a computing system, the schematic design with extracted view information pertaining to the extracted view based at least in part upon the binding information; and generating a response to a user action based at least in part upon the extracted view information or the binding information.

16. The article of manufacture of claim 15, the set of acts further comprising:

identifying a first user selection of a first schematic circuit component design in the schematic design; and emphasizing a first model corresponding to the first schematic circuit component design in the extracted view or a model tree structure in response to the first user selection.

17. The article of manufacture of claim 16, the set of acts further comprising:

identifying a second user selection of a second model in the extracted view; and emphasizing a second schematic circuit component design corresponding to the second model in the schematic design or a schematic design tree structure in response to the second user selection.

18. The article of manufacture of claim 15, the set of acts further comprising:

identifying a schematic circuit component design corresponding to the user action;

identifying a model corresponding to the schematic circuit component design from the extracted view; and determining a type for the schematic circuit component design.

19. The article of manufacture of claim 18, the set of acts further comprising:

identifying a point of interest in the schematic design based in part or in whole upon the type or the model that corresponds to the schematic circuit component design;

identifying one or more electrical characteristics at the point of interest by using at least the extracted view; and presenting the one or more electrical characteristics in a user interface.

20. The article of manufacture of claim 19, the set of acts further comprising at least one of:

performing disambiguation processing in response to the user action based at least in part upon the type for the schematic circuit component design; or performing error handling processing in response to the user action based at least in part upon the type for the schematic circuit component design.

* * * * *